United States Patent
Holloway et al.

(10) Patent No.: US 8,646,064 B1
(45) Date of Patent: Feb. 4, 2014

(54) DETERMINING THE LIKELIHOOD OF TRAFFIC BEING LEGITIMATELY RECEIVED AT A PROXY SERVER IN A CLOUD-BASED PROXY SERVICE

(71) Applicants: Lee Hahn Holloway, Santa Cruz, CA (US); Srikanth N. Rao, San Francisco, CA (US); Matthew Browning Prince, San Francisco, CA (US); Matthieu Philippe François Tourne, San Francisco, CA (US); Ian Gerald Pye, Santa Cruz, CA (US); Ray Raymond Bejjani, San Francisco, CA (US); Terry Paul Rodery, Jr., Millbrae, CA (US)

(72) Inventors: Lee Hahn Holloway, Santa Cruz, CA (US); Srikanth N. Rao, San Francisco, CA (US); Matthew Browning Prince, San Francisco, CA (US); Matthieu Philippe François Tourne, San Francisco, CA (US); Ian Gerald Pye, Santa Cruz, CA (US); Ray Raymond Bejjani, San Francisco, CA (US); Terry Paul Rodery, Jr., Millbrae, CA (US)

(73) Assignee: Cloudflare, Inc., San Francisco, CA (US)

( * ) Notice: Subject to any disclaimer, the term of this patent is extended or adjusted under 35 U.S.C. 154(b) by 0 days.

(21) Appl. No.: 13/665,807

(22) Filed: Oct. 31, 2012

Related U.S. Application Data

(60) Provisional application No. 61/719,116, filed on Oct. 26, 2012, provisional application No. 61/680,684, filed on Aug. 7, 2012.

(51) Int. Cl.
*G06F 15/16* (2006.01)

(52) U.S. Cl.
USPC .................. 726/12; 726/14; 726/23; 726/25

(58) Field of Classification Search
None
See application file for complete search history.

(56) References Cited

U.S. PATENT DOCUMENTS

| | | | |
|---|---|---|---|
| 7,178,166 B1 | 2/2007 | Taylor et al. |
| 7,307,999 B1 | 12/2007 | Donaghey et al. |
| 7,360,245 B1 | 4/2008 | Ramachandran et al. |
| 7,606,915 B1 | 10/2009 | Calinov et al. |
| 7,647,424 B2 | 1/2010 | Kim et al. |
| 8,161,145 B2 | 4/2012 | Carpenter et al. |
| 8,261,351 B1 | 9/2012 | Thornewell et al. |
| 2002/0002686 A1 | 1/2002 | Vange et al. |

(Continued)

OTHER PUBLICATIONS

Srikanth, Kandula et al. "Botz-4-sale: Surviving Organized DDoS Attacks That Mimic Flash Crowds," May 2005, In 2nd NSDI, 14 pages.

(Continued)

*Primary Examiner* — Kaveh Abrishamkar
(74) *Attorney, Agent, or Firm* — Blakely, Sokoloff, Taylor & Zafman LLP

(57) ABSTRACT

Message(s) are received from each one of multiple proxy servers, which are anycasted to the same IP address, that indicate source IP addresses of packets that are received that are directed to that same IP address. These proxy servers receive the packets as result of domain(s) resolving to that same IP address, and a particular one of the proxy servers receives the packets as a result of an anycast protocol implementation selecting that proxy server. Based on these message(s) from each of the proxy servers, a determination of the likelihood of a packet having a particular source IP address being legitimately received at each of the proxy servers is determined A message is transmitted to each of the proxy servers that indicates which source IP addresses of packets are not likely to be legitimately received at that proxy server.

27 Claims, 11 Drawing Sheets

(56) References Cited

U.S. PATENT DOCUMENTS

| | | | |
|---|---|---|---|
| 2005/0005107 A1 | 1/2005 | Touboul | |
| 2005/0120201 A1 | 6/2005 | Benaloh et al. | |
| 2006/0075491 A1 | 4/2006 | Lyon | |
| 2006/0272018 A1 | 11/2006 | Fouant | |
| 2007/0067839 A1 | 3/2007 | Hamada et al. | |
| 2007/0130619 A1 | 6/2007 | Reams | |
| 2007/0156592 A1 | 7/2007 | Henderson | |
| 2007/0258438 A1 | 11/2007 | Bennett | |
| 2008/0028463 A1 | 1/2008 | Dagon et al. | |
| 2008/0072293 A1 | 3/2008 | D'Urso | |
| 2008/0109657 A1 | 5/2008 | Bajaj et al. | |
| 2009/0144806 A1* | 6/2009 | Gal et al. | 726/3 |
| 2010/0031315 A1 | 2/2010 | Feng et al. | |
| 2010/0058471 A1* | 3/2010 | Kim | 726/22 |
| 2010/0138551 A1 | 6/2010 | Degaonkar et al. | |
| 2010/0138919 A1 | 6/2010 | Peng et al. | |
| 2010/0138921 A1 | 6/2010 | Na et al. | |
| 2011/0099622 A1 | 4/2011 | Lee et al. | |
| 2011/0179479 A1 | 7/2011 | Tsai et al. | |
| 2011/0270969 A1 | 11/2011 | Noh et al. | |
| 2011/0289134 A1 | 11/2011 | de los Reyes et al. | |
| 2011/0296509 A1 | 12/2011 | Todorov | |
| 2012/0036576 A1 | 2/2012 | Iyer | |
| 2012/0117649 A1* | 5/2012 | Holloway et al. | 726/24 |
| 2012/0124666 A1 | 5/2012 | Kim et al. | |
| 2013/0031356 A1* | 1/2013 | Prince et al. | 713/151 |

OTHER PUBLICATIONS

Pope, Clark et al. "Is it human or computer? Defending e-commerce with Captchas," Mar.-Apr. 2005, IT Professional, vol. 7, No. 2, pp. 43-49.

Djalaliev, P. et al. "Sentinel: Hardware-Accelerated Mitigation of Bot-Based DDoS Attacks," Computer Communications and Networks, Aug. 3-7, 2008. ICCCN '08. Proceedings of 17th International Conference on Computer Communications and Networks, pp. 1-8.

Longe, O.B. et al. "Checking Internet masquerading using multiple CAPTCHA challenge-response systems," 2nd International Conference on Adaptive Science & Technology, Jan. 14-16, 2009, ICAST 2009., pp. 244-249.

Non-Final Office Action, U.S. Appl. No. 13/665,811, dated Jan. 2, 2013, 15 pages.

Non-Final Office Action, U.S. Appl. No. 13/665,802, dated Jan. 25, 2013, 24 pages.

Final Office Action, U.S. Appl. No. 13/665,811, dated Apr. 11, 2013, 19 pages.

Notice of Allowance, U.S. Appl. No. 13/665,802, dated Aug. 1, 2013, 23 pages.

D. Holmes, "Mitigating DDoS Attacks with F5 Technology", F5 Networks, Inc., 2013, 19 pages.

* cited by examiner

CloudFlare settings

These settings are only applied to DNS records that you have enabled for CloudFlare.

| Settings overview | Security settings | Performance settings |

Security profile

Choose the appropriate security profile for your website, which will automatically adjust each of the security settings. If you choose to customize an individual security setting, the profile will become Custom.

Custom ▼

Individual security settings

Basic protection level
Adjust your basic security level to modify CloudFlare's protection behavior. Learn more...

Medium ▼
- I'm under attack!
- High
- Medium
- Low
- Essentially Off

Challenge passage TTL
Specify how long a visitor is allowed access to your site after completing a challenge. Learn more...

FIG. 8

Checking your browser before accessing www.example.com.

This process is automatic. Your browser will redirect to your requested content shortly. Please allow up to 5 seconds ...

Checking your browser before accessing www.example.com.

Please turn JavaScript on and reload the page.

```html
<!DOCTYPE HTML> <html lang="en-US"> <head> <meta http-equiv="content-type" content="text/
html; charset=UTF-8"> <meta charset="UTF-8">
<title>Just a moment...</title>
<link rel="stylesheet" media="screen" href="/cdn-cgi/styles/js-challenge/error.css" type="text/css">
</head>
<body>
<table width="100%" height="100%" cellpadding="30">
<tr>
<td align="center" valign="center">
<h1>Checking your browser before accessing www.example.com.</h1>
<noscript>
<h1 style="color:red;"><strong>Please turn JavaScript on and reload the page.</strong></h1>
</noscript>
<div id="challenge" style="display:none;">
<p>This process is automatic. Your browser will redirect to your requested content shortly.</p>
<p>Please allow up to 5 seconds...</p>
<img src="/cdn-cgi/images/spinner.gif" style="margin: 40px 0 30px 0;"/>
<form id="ChallengeForm" action="http://www.example.com/" method="POST">
<input type="hidden" name="act" value="jschl"/>
<input type="hidden" name="jschl_vc" value="afdfe7c28f5a761da03a83347c8d0382"/>
<input type="hidden" id="jschl_answer" name="jschl_answer"/>
</form>
</div>
<div style="margin-top:20px;">
<a href="http://www.cloudflare.com/" target="_blank" style="font-size: 12px;">DDoS protection by
CloudFlare</a>
</div>
</td>
</tr>
</table>
<script type="text/javascript" src="/cdn-cgi/scripts/jquery-1.4.2.min.js"></script>  ⎫
<script type="text/javascript">                                                       |
    //<![CDATA[                                                                       |
    $('#challenge').show();                                                           |
    $(function(){setTimeout(                                                          |
      function(){                                                                     ⎬ 1110
        $('#jschl_answer').val(3+26*1);                                               |
        $('#ChallengeForm').submit();                                                 |
      },                                                                              |
      5850                                                                            |
    )});                                                                              |
    //]]>                                                                             |
  </script>                                                                           ⎭
</body>
</html>
```

DETERMINING THE LIKELIHOOD OF TRAFFIC BEING LEGITIMATELY RECEIVED AT A PROXY SERVER IN A CLOUD-BASED PROXY SERVICE

CROSS-REFERENCE TO RELATED APPLICATIONS

This application claims the benefit of U.S. Provisional Application No. 61/719,116, filed Oct. 26, 2012, and U.S. Provisional Application No. 61/680,684, filed Aug. 7, 2012, which are each hereby incorporated by reference.

FIELD

Embodiments of the invention relate to the field of network communication; and more specifically, to detecting and mitigating denial-of-service (DoS) attacks in a cloud-based proxy service.

BACKGROUND

Denial-of-Service (DoS) attacks are becoming more commonplace on the Internet and are difficult to detect and mitigate. Generally speaking, a DoS attack is launched to make a particular website unavailable. DoS attacks commonly include sending a large amount of packets to the website with the intention to cause the website to be unavailable or respond slowly to legitimate traffic. A common DoS attack is a distributed DoS (DDoS) attack where multiple clients transmit a large amount of traffic directed at a target website in an attempt to overwhelm it. The clients in a DDoS attack are commonly devices that have been compromised (e.g., infected with a virus) and form a botnet that is used to launch the attacks. Other common DoS attacks include attacks on web infrastructure including attacking User Datagram Protocol (UDP), Transmission Control Protocol (TCP), Internet Control Message Protocol (ICMP), Hypertext Transfer Protocol (HTTP), HTTP Secure (HTTPS), SPDY, Domain Name System (DNS) and/or other protocols.

BRIEF DESCRIPTION OF THE DRAWINGS

The invention may best be understood by referring to the following description and accompanying drawings that are used to illustrate embodiments of the invention. In the drawings:

FIG. 8 illustrates an exemplary interface that allows a domain owner to indicate that they are under attack and would like to be in the heightened security mode according to one embodiment;

FIG. 11 illustrates exemplary code for a page where a client-side script has been inserted that determines a likelihood of whether the visitor is a browser according to one embodiment;

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A method and apparatus for denial-of-service (DoS) detection and mitigation in a cloud-based proxy service is described. In one embodiment, the cloud-based proxy service is available as a service over the Internet and does not require customers (e.g., domain owners and/or personnel working on behalf of domain owners) to install additional hardware or software in order to support the service. In one embodiment, the cloud-based proxy service is provisioned through a change in Domain Name System (DNS) records of the customers.

Figure 1:
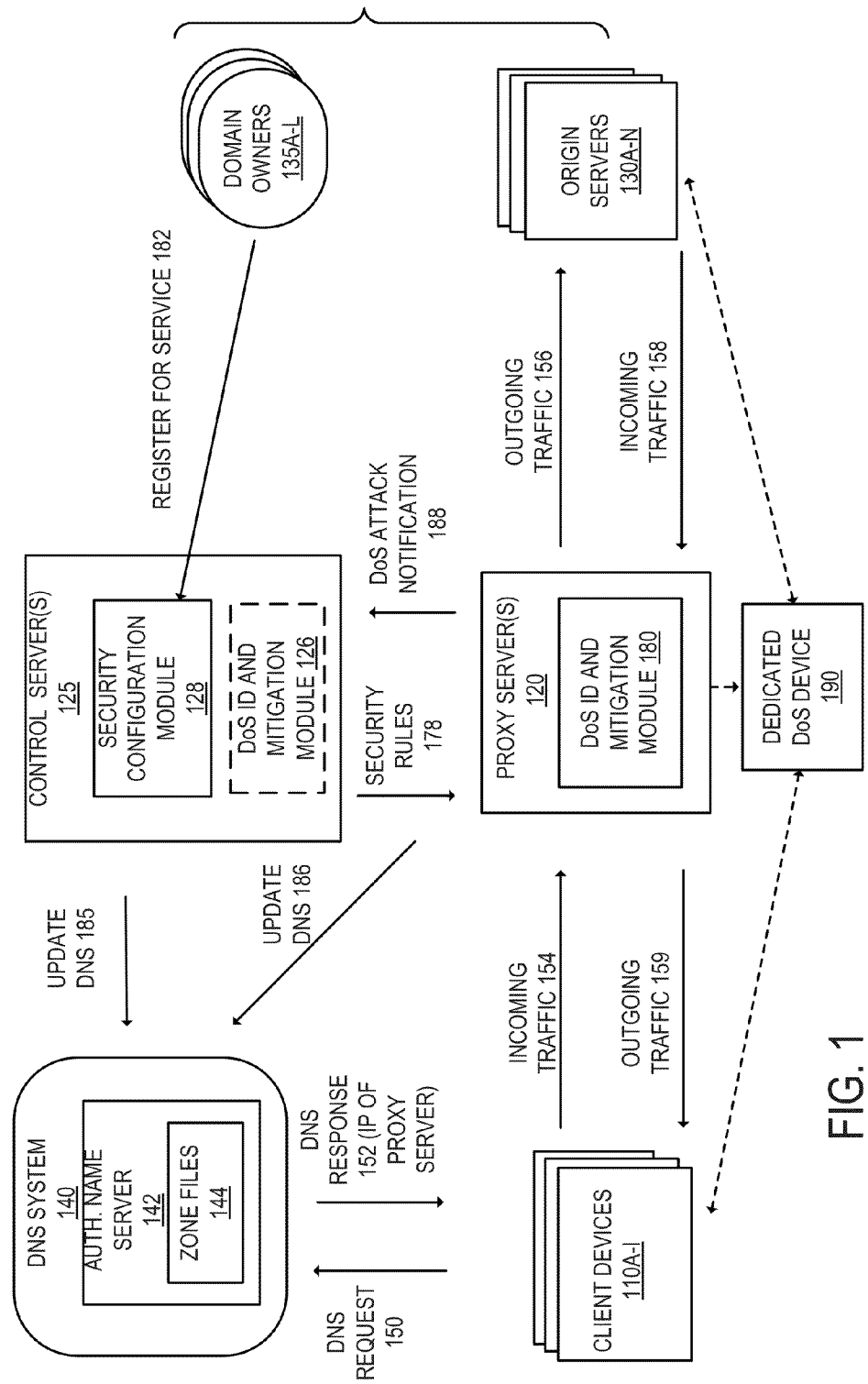
FIG. 1 illustrates an exemplary system for a cloud-based proxy service according to one embodiment.

FIG. 1 illustrates an exemplary system for a cloud-based proxy service according to one embodiment. The cloud-based proxy service illustrated in FIG. 1 includes a set of proxy server(s) 120 that are situated between the client computing devices 110A-I and the origin servers 130A-N. In one embodiment, the proxy server(s) 120 are reverse proxy servers. Certain network traffic is received and processed through the set of proxy server(s) 120. For example, web traffic (e.g., HTTP requests/responses, HTTPS requests/responses, SPDY requests/responses, etc.) for domains of the origin servers 130A-N may be received and processed at the proxy server(s) 120. In one embodiment, the domain owners 135A-L are customers of the cloud-based proxy service and certain network traffic for their websites are received at processed at the proxy server(s) 120.

The client devices 110A-I are computing devices (e.g., laptops, workstations, smartphones, palm tops, mobile phones, tablets, gaming systems, set top boxes, etc.) that are capable of transmitting network traffic. The network traffic may be legitimate network traffic or illegitimate network traffic (e.g., traffic that is part of a denial-of-service (DoS) attack). Each of the client devices 110A-I executes a client network application that is capable of transmitting network traffic. For example, the client network application may be a web browser or other application that can access network resources (e.g., web pages, images, word processing documents, PDF files, movie files, music files, or other computer files) using the client network application. The client network application may also be a scripting application or other application that may be participating in a DoS attack.

The origin servers 130A-N are computing devices that may serve and/or generate network resources (e.g., web pages, images, word processing documents, PDF files movie files, music files, or other computer files). An origin server 130A-N may also be another proxy server to the server that serves and/or generates network resources. Although not illustrated in FIG. 1, it should be understood that the network resources of the origin servers 130A-N may be stored separately from the device that responds to the requests.

The cloud-based proxy service may provide different services for customers (e.g., the domain owners 135A-L). By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment and as described in greater detail later herein, the cloud-based proxy service also provides DoS attack detection and mitigation services for the domain owners 135A-L.

Generally speaking, the proxy server(s) 120 receive certain network traffic from the client devices 110A-I that are destined for one of the origin servers 130A-N. For example, a proxy server 120 may receive requests for an action to be performed on an identified resource of an origin server (e.g., an HTTP GET request, an HTTP POST request, other HTTP request methods, or other requests to be applied to an identified resource on an origin server) from the client devices 110A-I. As illustrated in FIG. 1, the incoming traffic 154 is received at one of the proxy server(s) 120.

The proxy server(s) 120 analyze the incoming traffic 154 and take one or more actions on the incoming traffic. As will be described in greater detail later herein, the incoming traffic 154 may be part of a DoS attack and steps may be taken to mitigate the attack. However, assuming, for example that there is not a threat or a DoS attack, the proxy server 120 may transit the outgoing traffic 156 to the appropriate origin server 130. For example, the proxy server may transmit a request (e.g., an HTTP GET request) for a resource of the origin server 130. The origin servers 130A-N respond to the outgoing traffic 156 with the incoming traffic 158. For example, an origin server may transmit a response (e.g., an HTTP response) with the requested resource to the proxy server(s) 120. The proxy server(s) 120 may analyze the incoming traffic 158 and take one or more actions, including, for example, transmitting the outgoing traffic 159 to the requesting client device. The proxy server(s) 120 may also cache resources for the domains and respond to requests from client devices locally if the requested resource is in cache.

In some embodiments, the incoming traffic 154 is received at a particular proxy server 120 as a result of a DNS request 150 for a domain of one of the domain owners 135A-L resolving 152 to an IP address of the proxy server 120. By way of example, DNS record(s) for the domain "example.com" may resolve to an IP address of a proxy server 120. In some embodiments, multiple domains that may be owned by different domain owners may resolve to the same proxy server 120 (e.g., the same IP address or a different IP address of the proxy server 120).

The DNS system 140 is used to refer to the DNS system as a whole and includes multiple DNS servers to resolve DNS requests. As illustrated, the DNS system 140 includes the authoritative name server 142, which may be an authoritative name server for the cloud-based proxy service and the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed. In one embodiment, the authoritative name servers for each the domains have been changed to the authoritative name server 142, which is associated with the service. It should be understood that the backup authoritative name servers serving the domains may also be changed. In one embodiment, the zone file records 144 for the domains of the domain owners 135A-L are changed such that DNS resolution requests for those domains resolve to the proxy server(s) 120.

Although not illustrated in FIG. 1, in one embodiment the cloud-based proxy service includes multiple nodes (referred herein as "proxy service nodes"). Each proxy service node may include any of one or more proxy servers, one or more control servers, one or more DNS servers (e.g., one or more authoritative name servers), and one or more other pieces of networking equipment (e.g., one or more routers, switches, hubs, etc.). The proxy service node may be part of the same physical device or multiple physical devices. For example, the proxy server(s), control server(s), and DNS server(s) may be virtual instances running on the same physical device or may be separate physical devices. Each proxy service node may be part of a data center or a collocation site.

The cloud-based proxy service also includes the control server(s) 125 which are operated by the service. In one embodiment, the control server(s) 125 provide a set of tools and interfaces for the domain owners 135A-L and is accessible over the Internet. For example, the control server(s) 125, among other things, allow the customers 135A-L to register for the cloud-based proxy service 182. The control server(s) 125 include the security configuration module 128 which allows the domain owners 135A-L to configure security settings for their domain(s), which will be described in greater detail later herein. Although not illustrated in FIG. 1, the control server(s) 125 may also allow the domain owners 135A-L to configure other settings for their domain(s) including content optimization settings and/or performance settings (e.g., such as how extensive caching will be done by the proxy server(s) 120, etc.), and which can be selectively applied to one or more of their pages and/or resources. As will be described in greater detail, in some embodiments the control server(s) 125 also are used to identify DoS attacks and/or mitigate DoS attacks.

In some embodiments, the domain owners 135A-L register for the cloud-based proxy service including changing their authoritative name server(s) to authoritative name server(s) of the service (the service may specify to the domain owners the name server(s) to use). Although not illustrated, the control server(s) 125 may provide an interface (e.g., a website) for the domain owners 135A-L to register for the cloud-based proxy service and possibly change their authoritative name server(s) and DNS record(s). In addition, the IP address(es) that resolve to their origin server(s), which host content of their domain, are changed to point to one or more proxy server(s) 120, which are typically chosen by the service. In other embodiments, individual DNS records are changed to point to a proxy server 120 (or point to other domain(s) that point to a proxy server of the service). For example, a DNS record of a domain owner can be changed to point to a CNAME that corresponds with a proxy server 120. The control server(s) 125 may transmit a DNS update 185 to the DNS system 140 to change the DNS record(s) of a domain owner. Regardless of the embodiment, traffic from visitors that are directed to a customer's domain is received at one of the proxy server(s) 120.

In some embodiments, the cloud-based proxy service includes multiple proxy servers that are geographically distributed. For example, in some embodiments, the service uses multiple proxy service nodes that are geographically distributed to decrease the distance between requesting client devices and content. The authoritative name servers may have a same anycast IP address and the proxy servers may have a same anycast IP address. As a result, when a DNS request is made, the network transmits the DNS request to the closest authoritative name server (in terms of the routing protocol metrics). That authoritative name server then responds with one or more IP addresses of one or more proxy servers within the proxy service node. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest proxy service node.

A proxy service node, including any of the router(s), switch(es), proxy server(s), and DNS server(s) of the node, may receive legitimate traffic and illegitimate traffic. As used herein, illegitimate traffic is traffic that is not meant for a legitimate purpose, even though it may include legitimate content. The illegitimate traffic may be part of a DoS attack. A DoS attack typically involves transmitting a large amount of traffic at an identified target in an attempt to delay or interrupt the service provided by that target such that the target cannot respond, or responds slowly, to legitimate traffic. The DoS attack may be a distributed DoS (DDoS) attack where multiple clients transmit a large amount of traffic directed at a target. In a DDoS attack, usually the clients are devices that are infected with a virus, Trojan, or other malware that allows an attacker to carry out the attack. Illegitimate traffic may include traffic that is not malformed and is otherwise legitimate but for its intent, which is typically to overload a system to prevent it from servicing other legitimate traffic. For example, the traffic may be a large number of legitimate HTTP requests (much larger than would otherwise be expected) transmitted from a single client or a group of clients that are participating in a DoS attack. As another example, a DDoS attack may be in the form of excessive cookies, headers, HTML content, etc., that is designed to overload system resources.

At any given time, the target for a DoS attack may be at one of the domains owned by the domain owners 135A-L, at a domain of the service (e.g., the domain hosting the service), and/or at an IP address of a proxy server 120. The attacks may be at different OSI layers (e.g., layer 3 attacks, layer 4 attacks (e.g., a SYN flood attack), layer 7 attacks (e.g., a large number of HTTP requests).

The cloud-based proxy service identifies and mitigates DoS attacks. The identification and/or mitigation may be performed in coordination with multiple components of the cloud-based proxy service (e.g., at one or more proxy service nodes). For example, in one embodiment, the proxy server(s) 120 and/or the control server(s) 125 identify DoS attacks and one or more mitigation actions may be taken by the proxy server(s) 120 and/or the control server(s) 125 (e.g., installing rules such as rate limiting, null routing, etc., on the proxy servers and/or the router(s) or switch(es)). In one embodiment, the proxy server(s) 120 each include the DoS identification and mitigation module 180 that identifies DoS attacks and takes steps to mitigate their effectiveness. In one embodiment, the control server(s) 125 each include the DoS identification and mitigation module 126 that identifies DoS and takes steps to mitigate their effectiveness. Thus, in some embodiments the proxy server(s) 120 may identify DoS attacks and perform mitigation and in other embodiments the control server(s) 125 may identify DoS attacks and cause mitigation actions to be performed.

DoS attacks may be identified in several different ways, which may be different based on the type of attack. Many DoS attacks involve sending a large amount of traffic of a certain type to an intended target. In one embodiment, the DoS identification and mitigation module 180 and/or the DoS identification and mitigation module 126 determines when there is an abnormal amount of traffic that is destined to a particular destination (e.g., the traffic spikes from what is normally encountered). By way of example, a proxy server 120 and/or the control server(s) 125 may establish a threshold amount of what the normal traffic rate is for a domain and/or IP address and determine when traffic exceeds that threshold. In one embodiment, the normal traffic rates may be individual and separate for a particular data center or proxy service node and the DoS attack is identified for each individual proxy service node, while in some embodiments the a DoS attack is identified through an aggregation of traffic across all proxy service nodes that handle traffic for that domain.

By way of a specific example, a DoS attack may be detected by using one or more parameters that exceed a threshold, including one or more of the following to a particular domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DoS attack. For example, the cloud-based proxy service may detect if a domain has gone offline due to a heavy load, which may be an indication of a DoS attack. As another example, the detection of a spike in metrics pertaining to a page or a resource request may be an indication of a DoS attack (e.g., a particular request header, cookie, size of the request, non-standard control characters, a large number of GET parameters, a large number of POST parameters, etc.).

Some DoS attacks may be directed to a particular domain (e.g., example.com). Since, in some embodiments multiple domains point to the same IP address of a proxy server, the proxy server may perform additional actions to identify and possible isolate the domain that is being targeted.

For example, in one embodiment, upon detecting a potential attack directed to an IP address, the proxy server and/or control server scatters the domains that point to that IP address across multiple IP addresses. For example, the proxy server and/or control server may cause the DNS records for at least some of those domains to be changed such that they will point to different IP addresses.

Figure 2:
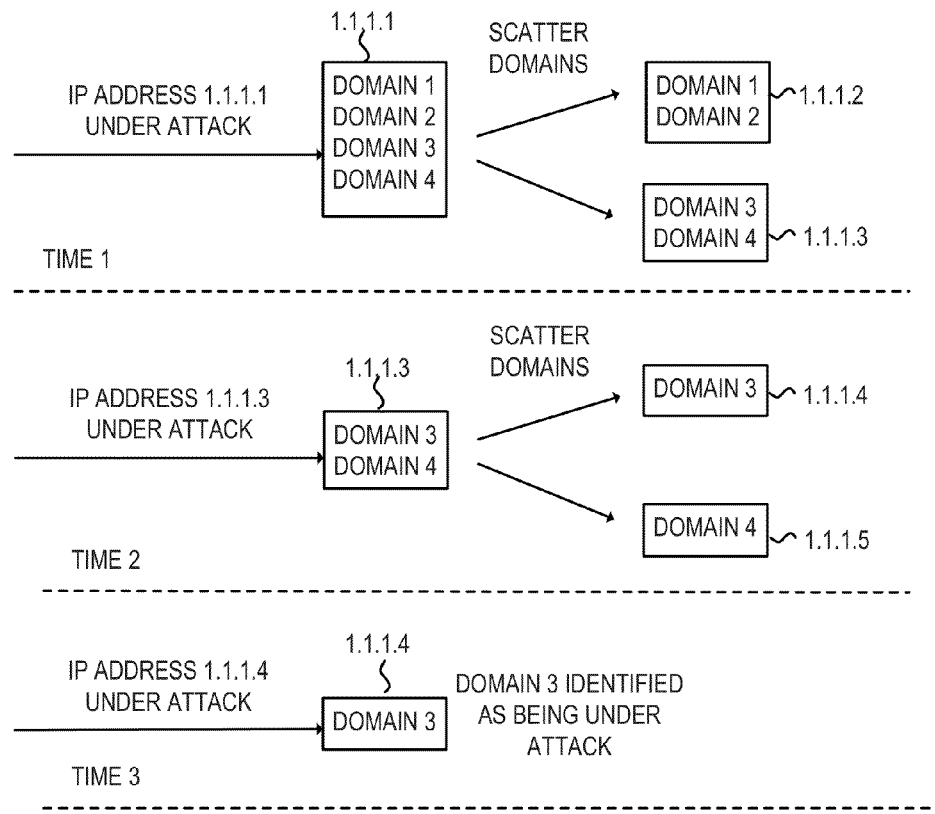
FIG. 2 illustrates an example of scattering domains in an attempt to identify a domain that is under attack according to one embodiment.

FIG. 2 illustrates an example of scattering domains in an attempt to identify a domain that is under attack according to one embodiment. Figure 'b will be described with respect to a proxy service node. The operations described with respect to Figure 'b may be performed by proxy server(s) and/or control server(s) of a proxy service node in some embodiments.

In one embodiment, a proxy service node that detects an attack directed to an IP address performs the scattering operations described with respect to FIG. 2. At a time one, an attack is directed at the IP address 1.1.1.1, which is associated with multiple domains (domain 1-domain 4). While FIG. 2 illustrates that the IP address 1.1.1.1 is associated with four domains, it should be understood that this number is exemplary as IP addresses may be associated with less number of domains or more numbers of domains. In one embodiment, the proxy service node detects the attack as described above (e.g., there may be an abnormally high amount of traffic to the IP address 1.1.1.1). Since there are multiple domains that share the IP address 1.1.1.1, the DoS attack may be directed at any of those domains (if the attack is domain based). Instead of performing mitigating actions for each of those domains, which could negatively affect those domains that are not the target of the attack, the proxy service node may scatter those domains to different IP addresses to narrow down which domain is the target of the attack.

As illustrated in FIG. 2, domain 1 and domain 2 have been scattered to resolve to the IP address 1.1.1.2 and the domain 3 and domain 4 have been scattered to resolve to the IP address 1.1.1.3. In one embodiment, the proxy service node causes the DNS records for those domains to be changed such that domain 1 and 2 will resolve to the IP address 1.1.1.2 and the domain 3 and 4 will resolve to the IP address 1.1.1.3. If the attack is targeted at a domain, then the attack should follow the change to the new IP address. As illustrated in FIG. 2, at a time 2, an attack is directed at the IP address 1.1.1.3, which is now associated with domain 3 and domain 4. The proxy service node scatters domain 3 to resolve to the IP address 1.1.1.4 and scatters domain 4 to resolve to the IP address 1.1.1.5. At a time 3, an attack is directed at the IP address 1.1.1.4, which is assigned to domain 3 only. Thus, by progressively scattering the domains to resolve to different IP address, the attack has been identified as being targeted at domain 3.

It should be understood that there are a number of ways for scattering the domains to different IP addresses. For example, while FIG. 2 illustrated an iterative scattering process, in some embodiments each of the domains may be scattered to a different IP address with a single scattering process. Although FIG. 2 illustrated scattering the domains equally (e.g., scattering four domains to two groups of two, etc.), the domains may be scattered unequally. For example, the domains may be scattered based on a set of one or more parameters associated with those domains (e.g., content of the domain, amount of traffic historically seen for the traffic, history of DoS attacks, etc.). By way of a specific example, domain(s) that have been previously attacked may be scattered to an IP address different than the domain(s) that have not been previously attacked.

While FIG. 2 illustrates that the IP address that is being attacked is not used for any the scattered domains (e.g., the IP address 1.1.1.1 is not assigned to any of the domains 1-4 after the determination that the IP address 1.1.1.1 is under attack), in some embodiments that IP address may be assigned to one or more of the scattered domains.

While FIG. 2 illustrates identifying the specific targeted domain, in some embodiments, the scattering process is performed to narrow the possibilities of the domain that is being attacked without identifying the domain that is being attacked. For example, with reference to FIG. 2, the scattering process described at time 2 may not be performed. In such a case, either the domain 3 or domain 4 would be under attack.

Figure 3:
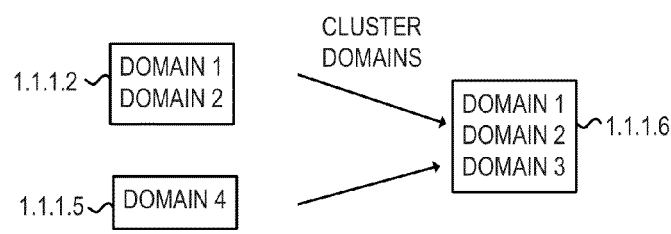
FIG. 3 illustrates an example of clustering the domains that were determined to not be under attack according to one embodiment.

After scattering the domains and determining the domains that are not under attack, the proxy service node may cause those domains to be clustered back together and share the same IP address. For example, FIG. 3 illustrates an example of clustering the domains that were determined to not be under attack of FIG. 2 according to one embodiment. For example, domain 1 and domain 2 were scattered to resolve to the IP address 1.1.1.2 and domain 4 was scattered to resolve to the IP address 1.1.1.5, and neither of these IP addresses are under attack. The proxy service node clusters these domains to resolve to the same IP address 1.1.1.6. For example, the proxy service node may cause the DNS records for the domains 1, 2, and 4 to be changed so that they each resolve to the IP address 1.1.1.6. Instead of choosing a new IP address (1.1.1.6), the proxy service node may cluster the domains together using either of the IP addresses 1.1.1.2 or 1.1.1.5.

In one embodiment, the proxy service node includes a number of zone maps that each includes one or more zones (e.g., domain names). Each zone map is also associated with a set of one or more IP addresses of the proxy. In order to identify which domain is the target of the attack, the zones may be split into multiple zone maps, each of which may be associated with a different set of IP addresses of the proxy service node. The proxy service node may then cause the DNS records for those domains to be changed such that those domains will point to the different IP addresses according to the zone map.

If the attack is domain related (e.g., directed at a specific domain as opposed to being directed at an IP address), then the attack should follow to the changed IP address. The proxy server can further determine the zone map that includes the domain that is being attacked. This process may continue iteratively until the domain being attacked is isolated. Other types of attacks may be IP based (e.g., directed to an IP address and not a domain).

In some embodiments, actions are also taken to isolate the attack to a particular data center or server cluster. For example, after detecting that an attack is affecting a particular IP address, the attack may be isolated to data center(s) or server cluster(s) by causing the router(s) for the other data center(s) or server cluster(s) to stop announcing a route to that IP address (which will cause traffic to not be directed to those data center(s) or server cluster(s)). As another example, the attack may be isolated to data center(s) or server cluster(s) by changing the IP address(es) that are announced for the domain to IP address(es) that belong to those data center(s) or server cluster(s). As yet another example, domain(s) that are not the target of the attack that may nevertheless be affected by the attack hitting a particular data center may be moved out of that data center.

After identifying an attack and potentially after isolating the attack target, the DoS identification and mitigation module 180 and/or 126 causes one or more mitigation actions to be performed, which may include rate limiting, broadcasting filtering rules to network equipment (e.g., routers, switches, etc.) in the wide area network (WAN) upstream and/or downstream from the proxy server, null routing the targeted IP address (after moving the domain(s) that resolve to that targeted IP address to different IP address(es)), null routing the source IP address (the source IP address of an attacking computing device), changing the routing such that traffic for the targeted IP address points to a particular data center, set of data centers, or a hardware device that is dedicated to handling attacks, presenting one or more challenges to visitors, and/or increasing the amount of resources and/or the types of resources being cached for the targeted domain. It should be understood that these are example mitigation action(s), and it should be understood that other mitigation actions may be performed in some embodiments.

As described above, in some embodiments, the service uses the anycast protocol when directing traffic to a proxy server. Use of the anycast protocol to direct traffic to a proxy server also helps mitigate a DoS attack. For example, most DDoS attacks are launched from compromised computers (e.g., compromised with a virus or bot) that form a botnet. This botnet may be geographically distributed around the Internet. For example, some of the computers of the botnet may be in different countries or regions around the world. Since in some embodiments the service uses the anycast protocol to direct requests to a proxy server, the surface area of the attack is increased and the effectiveness of the attack is correspondingly decreased. By way of example, if an IP address is anycasted at multiple proxy servers that are geographically distributed (e.g., multiple proxy servers around the world), a DDoS attack directed at that IP address may be automatically distributed to those multiple proxy servers due to anycast, thereby reducing the attack's effectiveness.

Figure 4:
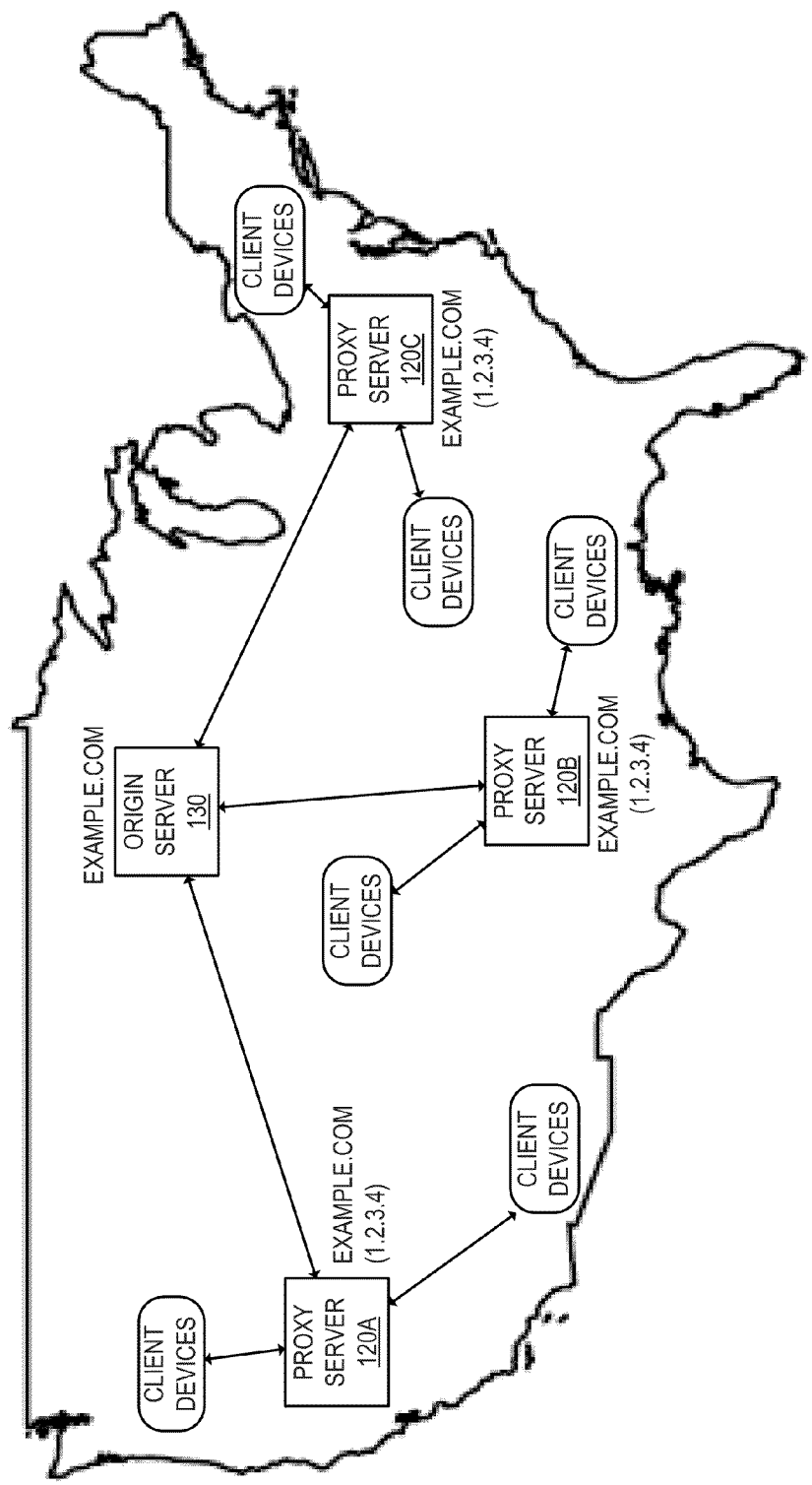
FIG. 4 illustrates an exemplary anycast network of the cloud-based proxy service according to one embodiment.

For example, FIG. 4 illustrates an exemplary anycast network. As shown in FIG. 4, there are three proxy servers (120A-C) geographically distributed across the contiguous United States (e.g., the proxy server 120A is located on the West Coast of the US, the proxy server 120B is located in the middle of the US, and the proxy server 120C is located on the East Coast of the US). The domain "example.com" resolves to the anycasted IP address 1.2.3.4, which may be served by any of the proxy servers 120A-C. Thus, when sending traffic to the IP address 1.2.3.4, the network infrastructure determines which ones of the proxy servers 120A-C to direct the traffic to, typically based on the "closest" server (in terms of the routing protocol metrics (e.g., BGP metrics)). Generally speaking, the routing protocol metrics typically have a relationship to physical location. For example, it is likely that traffic to "example.com" from client devices in the western portion of the US will be directed to the proxy server 120A, traffic to "example.com" from client devices located in the middle of the US will be directed at the proxy server 120B, and traffic to "example.com" from client devices located in the Eastern portion of the US will be directed to the proxy server 120C. Thus, if a DoS attack is launched at "example.com" from the Western portion of the US (that is, the client devices that are part of the DoS attack are generally located in the Western portion of the US), it is likely that proxy server 120A will receive the majority of the traffic of the DoS attack and the proxy servers 120B and 120C (and thus the client devices that connect to "example.com" through those proxy servers) will largely be unaffected by the attack. It should be understood that the anycast network illustrated in FIG. 4 is exemplary, as there may be, and often are, proxy servers geographically distributed around the world, for example.

Figure 5:
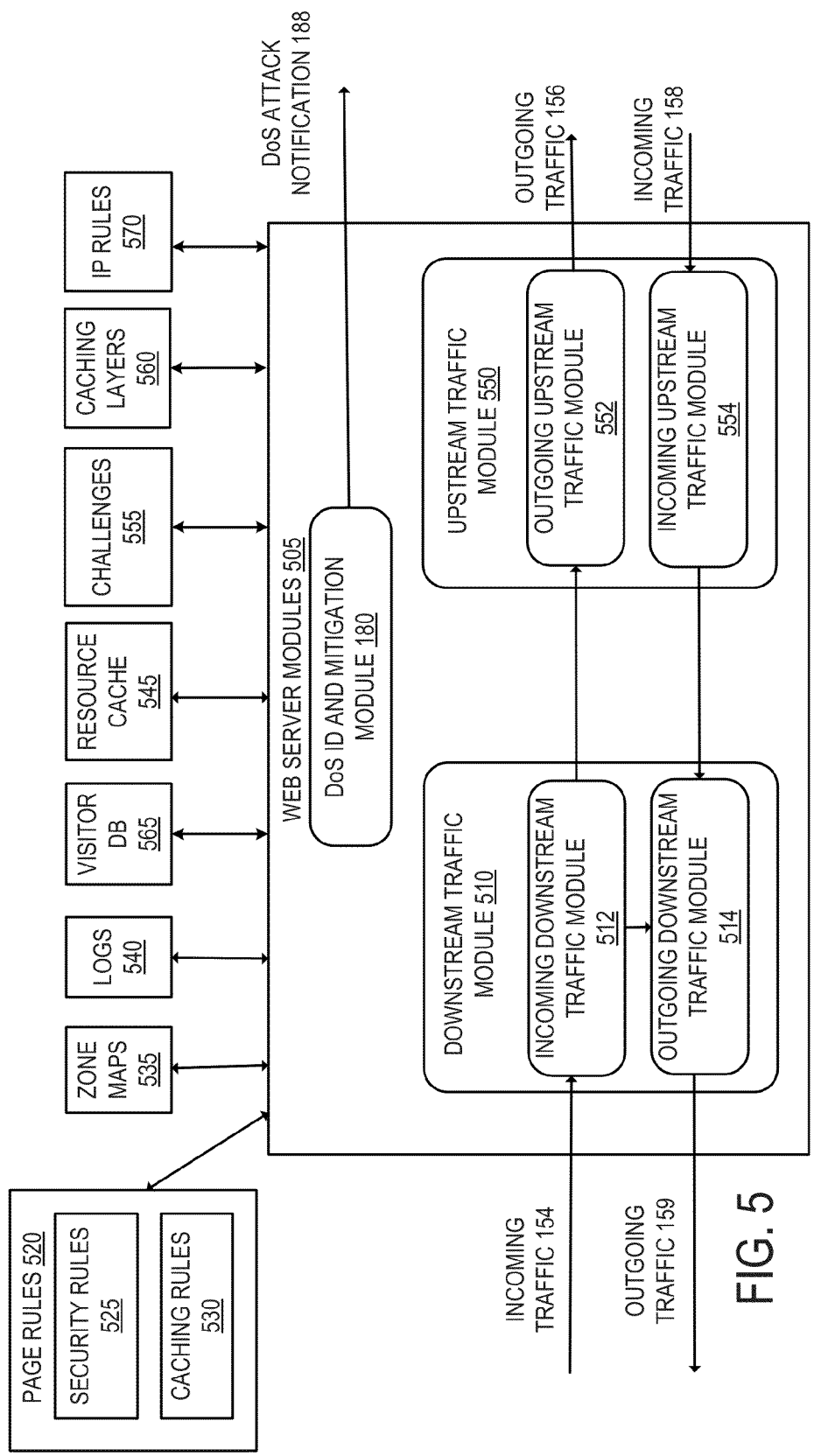
FIG. 5 is a block diagram that illustrates exemplary software architecture of a proxy server of the cloud-based proxy service according to one embodiment.

FIG. 5 is a block diagram that illustrates exemplary software architecture of a proxy server 120 according to one embodiment. It should be understood that the architecture illustrated in FIG. 5 is exemplary, and other architectures may be used in other embodiments. The proxy server 120 includes the web server modules 505, which include the downstream traffic module 510, the upstream traffic module 550, and the DoS ID and mitigation module 180. The web server modules 505 are coupled with a number of data structures and memory and caching systems. The use of the terms downstream and upstream is relative to the proxy server. An example of devices that are upstream of the proxy server is the backend servers that host content (e.g., the origin servers). Examples of devices that are downstream of the proxy server are the client devices that request content from the backend servers.

The downstream traffic module 510 includes the incoming downstream traffic module 512 that receives and processes traffic from devices downstream from the proxy server 120. For example, the incoming downstream traffic module 512 receives incoming traffic 154 from the client devices 110A-I. The downstream traffic module 510 also includes the outgoing downstream traffic module 514 that formats and transmits traffic to devices downstream from the proxy server 120 (e.g., the outgoing traffic 159 to the client devices 110A-I).

The upstream traffic module 550 includes the outgoing upstream traffic module 552 that formats and transmits traffic to devices that are upstream of the proxy server 120. For example, the outgoing upstream traffic module 552 transmits the outgoing traffic 156 to the origin servers 130A-N. The upstream traffic module 550 also includes the incoming upstream traffic module 554 that receives and processes traffic from devices that are upstream of the proxy server 120 (e.g., the incoming traffic 158 from the origin servers 130A-N).

The proxy server 120 analyzes incoming traffic and may determine to drop traffic if it is of an unexpected type and/or an unsupported type of traffic. For example, in some embodiments, a proxy server 120 expects only certain traffic such as web traffic. Receiving traffic that it is not expecting is an indication that the traffic is illegitimate. For example, if the proxy server 120 is only expecting to receive web traffic, it may drop any UDP packets it receives. In a similar fashion, the proxy server 120 may drop traffic received on ports that it does not serve. For example, in some embodiments, the proxy server 120 is not expecting to receive Secure Shell (SSH) traffic, Mail traffic, or DNS traffic (e.g., on ports 22, 25, and 53 respectively), and therefore drops that traffic if received. In one embodiment, the proxy server 120 drops all traffic that is not received on a set of specified ports (e.g., port 53, port 80, port 443, port 8080, port 8888, etc.). In one embodiment, in addition to or in lieu of the proxy server 120 being configured to drop traffic if that traffic is of an unexpected type and/or an unsupported type of traffic, other types of network equipment of the proxy service node (e.g., router(s), switch(es), hub(s), etc.) may be configured to drop traffic of an unexpected and/or unsupported type.

With respect to FIG. 5, the proxy server 120 includes the IP rules 570 that store rules related to its IP addresses. As an example, the IP rules 570 may indicate the type of protocol of packets that are to be accepted and/or the port(s) on which traffic is accepted. As a specific example, the IP rules 570 may indicate that the incoming downstream traffic module 512 should accept traffic (not block traffic) received at a particular IP address only if that traffic is of a particular protocol type and/or received at a particular port (e.g., TCP packets on port 80). In one embodiment, upon receiving a packet, the incoming downstream traffic module 512 looks up the IP rules 570 for the destination IP address of the packet (which should be an IP address of the proxy server). In one embodiment, since the initial lookup for an IP address is relatively expensive, the result of the lookup may be store in the caching layers 560, which is typically stored in a relatively fast memory. For example, in a DoS attack, a particular IP address may receive many packets over a short period of time. In such a case, the IP rules for that IP address may be stored in the caching layers 560 to decrease the time necessary to determine whether to accept or block the packet directed to that IP address.

In a specific example, the network space of the service (e.g., the IP addresses of the service that are typically used for the proxy servers and the DNS name servers of the service) is divided into routable chunks (e.g., /24 Classless Inter-Domain Routing (CIDR) blocks), and each chunk is defined to receive a certain type of traffic and/or on a certain type of port. For example, a group of addresses 1.1.1.0/24 may be defined to only receive DNS traffic (e.g., traffic on port 53, UDP packets only). This group of addresses would be used for the DNS name servers of the service, for example. Since only that type of traffic is to be received, other types of traffic will be blocked. For example, HTTP traffic (port 80, TCP packets) will be blocked.

As another example, a group of addresses 1.1.3.0/24 may be defined to only receive HTTP traffic (e.g., traffic on port 80, TCP packets only). This group of addresses would be used on the proxy servers of the service. If traffic is received at one of these addresses on a different port than port 80 and/or is not TCP, then that traffic will be blocked. For example, if HTTPS traffic is received at the incoming downstream traffic module 512 (e.g., traffic on port 443) at one of these addresses, the incoming downstream traffic module 512 will block that traffic. As another example, if UDP packets are received at one of these addresses, the incoming downstream traffic module 512 will block those packets.

As yet another example, a group of addresses 1.1.4.0/24 may be defined to only receive HTTPS traffic (e.g., traffic on port 443, TCP packets only). This group of addresses would be used on the proxy servers of the service. If traffic is received at one of these addresses on a different port than port 443 and/or is not TCP, then that traffic will be blocked. For example, if HTTP traffic or UDP packets are received (e.g., traffic on port 80) at one of these addresses, the incoming downstream traffic module 512 will block those packets.

In one embodiment, the IP address allocations may be reallocated in the case of a DoS attack. For example, upon determining that there is a possible attack at a set of one or more IP addresses of a group, that set of IP addresses (or the entire group) may be reallocated to a different group. For example, in one embodiment, the DoS identification and mitigation module 180 reallocates the IP address allocations in response to a DoS attack. By way of a specific example, if a set of one or more IP addresses of the group of IP addresses 1.1.4.0/24, which has been defined to only accept TCP traffic on port 443 (e.g., HTTPS traffic), is receiving an abnormally large number of SYN TCP packets on port 443, that group may be reallocated as only to receive DNS traffic (e.g., UDP packets on port 53 only). Thus, continued SYN TCP attacks at those IP addresses will be blocked. As a part of reallocating that group, the domain(s) associated with those IP addresses will be associated with different IP addresses that are defined for HTTPS traffic (e.g., TCP traffic on port 443) if the reallocated group of IP addresses were the only IP addresses associated with those domain(s) that were defined for HTTPS traffic. For example, if the domain "example.com" is associated with IP address(es) of that group and is not associated with other IP address(es) that are defined for HTTPS traffic, then the domain "example.com" will be associated with other IP address(es) that are defined for HTTPS traffic.

While the above examples have been described with respect to CIDR notation, the examples above may be used in any group of IP addresses of the service, which may or may not be contiguous. For example, a group of IP addresses may include the IP addresses 1.1.1.1 and 1.1.1.3, but not 1.1.1.2.

Although an entire group of IP addresses may be reallocated if any one or more of them are experiencing an attack, in some embodiments only those IP addresses that are experiencing an attack are reallocated to a different group. For example, if the IP address 1.1.4.1 of the previously described group 1.1.4.0/24 is experiencing an attack (e.g., receiving an abnormally large amount of TCP packets on port 443) (and other IP addresses of the group are not), then only the IP address 1.1.4.1 may be allocated to a different group that is not defined to accept TCP packets on port 443.

As described above, the incoming downstream traffic module 512 receives and processes the incoming traffic 154 from the client devices 110A-I. The traffic may be legitimate traffic or illegitimate traffic. The incoming traffic 154 may include requests, such as HTTP/s requests. For example, after accepting the traffic and with respect to an HTTP request, the incoming downstream traffic module 512 determines the requested domain (e.g., as indicated in the host name field in the header of the request), and looks up the rules to apply to the domain from the page rules 520. As previously described, the control server 125 may allow the domain owners 135A-L to configure security settings, content optimization settings, performance settings, etc., which affect how the proxy server 120 processes traffic for those domain. These settings are stored in the proxy servers 120 in the page rules 520, which as illustrated in FIG. 5, include the security rules 525 and the caching rules 530. The security rules 525 indicate the security settings for the domain and the caching rules 530 indicate the caching settings for the domain (e.g., what should be cached by the proxy server). The page rules 520 may include other rules in some embodiments. After looking up the page rules 520 for the requested domain, the request module 510 may apply the appropriate rules when processing the incoming request.

In one embodiment, since the initial page rules lookup is relatively expensive (e.g., the page rules 520 may be stored in relatively slow memory or in mass storage), the result of the lookup is stored in the caching layers 560 (which is typically stored in a relatively fast memory). For example, the applicable rules for the domain may be cached in the caching layers 560. The caching layers may expire in a short period of time. However, in a DoS attack, it is likely that a proxy server 120 will receive many identical requests. In such a case, the rules for that domain may be stored in the caching layers 560 and the incoming downstream traffic module 512 may access the caching layers 560 for the rules instead of the page rules 520. This not only decreases the time necessary to process the request, but it also uses less resources of the proxy server 120 thereby reducing the effectiveness of a DoS attack on the proxy server 120. In another embodiment, the result of the application of the rules may be cached in the caching layers 560.

The incoming downstream traffic module 512 may also access the visitor database 565 after receiving a packet. The visitor database 565 includes information regarding visitors and may indicate a potential threat score applied to a particular visitor (e.g., based on previous accesses by that visitor). The visitor database 565 may identify visitors based on their IP addresses. The incoming downstream traffic module 512 may perform different actions depending on the visitor score and the particular security setting.

The caching layers 560 may also include a visitor cache that may store information regarding which visitors to block or challenge. As will be described in greater detail later herein, in some embodiments, the proxy server 120 performs rate limiting on certain source IP addresses, null routing on certain source IP addresses, and/or presents challenges to certain source IP addresses. By way of example, the proxy server 120 may cache in the caching layers 560 a decision to drop packets of a particular source IP address, rate limit traffic from that IP address, and/or present one or more challenges (e.g., a CAPTCHA). The challenges themselves may also be cached in the caching layers 560.

In one embodiment, the caching layers 560 also include cache(s) for a heightened level of security mode, referred herein as under-attack mode, which will be described in greater detail later herein. The under-attack mode is a security mode that may be applied to one or more web pages and/or web resources of a domain owner. The under-attack mode may be entered into after selection by a domain owner (e.g., the domain owner may be experiencing a slow response time on their site, a high CPU load, etc., which leads them to believe that they are under a DoS attack). The under-attack mode may also be entered into automatically if the service detects a possible DoS attack and/or if an administrator of the service detects a possible DoS attack. After determining to enter the under-attack mode, a rule that indicates that the mode is to be enacted is applied to the proxy server(s) 120 (e.g., as part of the security rules 525 for the web page(s) of the domain). The decision to apply the under-attack mode security settings may be cached in the caching layers 560. The under-attack mode may require one or more challenges to be passed as a condition of fulfilling a client's request (e.g., prior to delivering a web page). The caching layers 560 may cache the challenge(s) and/or the answer(s) to the challenge(s).

In the case of a request for a network resource (e.g., a web page), and assuming that the incoming downstream traffic module 512 determines to respond to the request, the incoming downstream traffic module 512 may access the resource cache 545 to determine whether the requested network resource is in the cache 545 and has not expired. If the resource is not in the cache or the cache has expired, the incoming downstream traffic module 512 causes the outgoing upstream traffic module 552 to transmit a request to the origin server 130 corresponding to the domain for the network resource.

The incoming downstream traffic module 512 may log properties of the incoming traffic 154 in the logs 540 (e.g., time of arrival, source IP address of the packet, destination IP address of the packet, resource requested, etc.). The logs 540 may be used to generate statistics for the domain owners 135A-L. For example, the logs 540 may be used by the DoS identification and mitigation module 180 to determine whether there is an abnormal amount of traffic that is being directed at a particular domain or IP address, which may be an indication that a DoS attack is being experienced. The logs 540 may also include other information such as the number of connections opened for the domain, the number of failed connections, client request metrics, etc. The client request metrics may include headers, cookies, size of the content, the contents of GET and/or POST parameters, number of GET and/or POST parameters, etc.

The incoming upstream traffic module 554 receives and processes incoming traffic 158 (e.g., incoming responses) from the origin servers 130. In some embodiments, the outgoing downstream traffic module 514 may present one or more of the challenges 555 to the client device, which may depend on the security rules applied for the domain, the threat score applied to the visitor, whether the visitor has previously successfully answered a challenge (which may be indicated by a cookie include in the incoming request), and/or whether the proxy server is executing in a DoS mitigation mode for the domain. The outgoing downstream traffic module 514 formulates a response to transmit to the client device and transmits the outgoing response.

The DoS identification and mitigation module 180 may identify potential DoS attacks, for example, based on information in the logs 540 (e.g., if there is an abnormally large amount of traffic being directed to an IP address). The module 180 may use the zone maps 535 to isolate the domain and/or IP address that is under attack, as previously described.

After identifying a potential DoS attack, the DoS identification and mitigation module 180 may take one or more mitigation actions as previously described, which may be dependent on the security rules that are set for domain(s) that are affected by the attack. Example mitigation actions include rate limiting the traffic for the attacked domain(s), dropping the traffic for the attacked domain(s), routing the traffic for the attacked domain(s) to a particular data center or hardware device that is dedicated to handling attacks (e.g., the dedicated DoS computing device 190), dropping the traffic received from potential attackers, presenting one or more challenges to visitors, increasing the amount of resources and/or the types of resources being cached for the attacked domain(s), and/or increasing the amount of time a rule or resource is cached.

The DoS identification and mitigation module 180 may also notify other proxy server(s) and/or the control server(s) 125 of a potential DoS attack 188. The control server(s) 125 may then notify the domain owner(s) of the attacked domain(s) (e.g., through email, a phone call, a text message, etc.) that their domain(s) may be experiencing a DoS attack. Those domain owner(s) may also be notified regarding what steps are being done to mitigate the DoS attack. The domain owner(s) may access the control server(s) 125 and override any automatic steps taken by the module 180 (e.g., either to increase the level of security or reduce the level of security). The control server(s) 125 may also notify other proxy server(s) of the DoS attack.

In some embodiments, instead of or in addition to the proxy server 120 identifying a DoS attack, a control server 125 of the proxy service node identifies a DoS attack and causes mitigation actions to be performed. For example, the information in the logs 540 may be communicated to the control server 125 (e.g., the information may be periodically pushed to the control server 125 or pulled from the proxy server 120) and used to identify an attack as previously described. Once an attack is identified, the control server 125 may cause one or more mitigation actions as previously described, to be performed.

Figure 6:
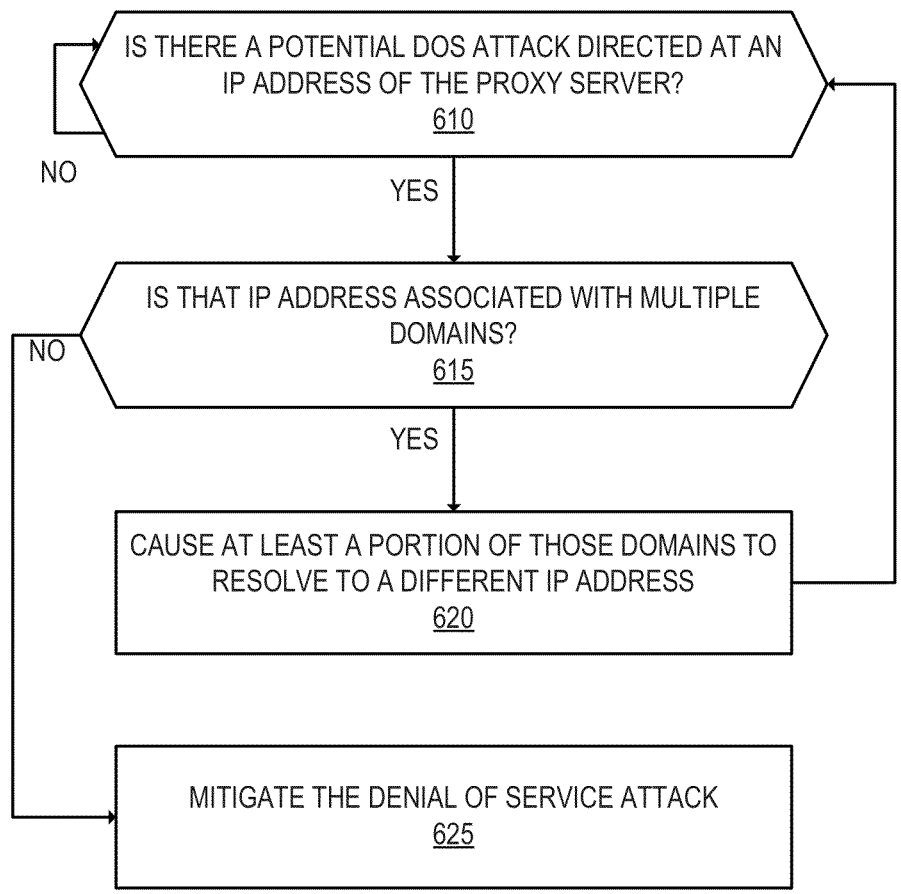
FIG. 6 is a flow diagram illustrating exemplary operations for detecting and mitigating a DoS attack according to one embodiment.

FIG. 6 is a flow diagram illustrating exemplary operations for detecting and mitigating a DoS attack according to one embodiment. In one embodiment, the operations described with reference to FIG. 6 are performed by a proxy service node. At operation 610, the proxy service node determines that there is a potential DoS attack underway. For example, an abnormally high amount of traffic flow directed to one of the IP addresses of a proxy server of the proxy service node may be detected. For example, the proxy service node may determine that the number of packets being received to that IP address is abnormally high, the amount of bandwidth being consumed is abnormally high, the number of UDP packets per second is abnormally high, the number of TCP packets per second is abnormally high, the number of open connections is abnormally high, and/or the ratio of successfully open connections versus failed connections is abnormally high. Of course, these are just examples, and the proxy server 120 may determine that there is abnormal flow traffic in any number of ways. As another example, the proxy service node may determine that there is a potential DoS attack underway through receipt of a message from a domain owner indicating that they are currently under attack. The message may also be sent as a result of an administrator of the service detecting a potential attack. If there is a potential DoS attack directed at an IP address of the proxy server, then flow moves from operation 610 to operation 615; otherwise flow remains at operation 610.

At operation 615, the proxy service node determines whether that IP address is associated with multiple domains. As described above, multiple domains that may be owned and/or operated by multiple domain owners may be associated with the same IP address at the proxy service node. As an example, the domain "example 1.com," "example2.com," and "example3.com" may resolve to the same IP address of a proxy server of the proxy service node. If the IP address that is experiencing abnormal traffic flow is associated with multiple domains, then flow moves to operation 620, otherwise flow moves to 625.

If the IP address that is experiencing abnormal traffic flow is associated with multiple domains, the proxy server 120 attempts to identify which domain may be the target of the attack. It may be possible that the target of the attack is only one of those domains. For example, the target of the attack may be only the domain "example1.com." In one embodiment, the proxy server 120 attempts to identify which domain may be the target of the attack through a domain scattering process as previously described herein, where the domains are scattered across multiple IP addresses (potentially multiple times).

At operation 620, the proxy service node causes at least a portion of those domains to resolve to different IP addresses. For example, the proxy service node may move each of those domains to a separate IP address in some embodiments. For example, the domains "example 1.com," "example2.com," and "example3.com," may each be moved to their own IP address of the proxy service node. In other embodiments the proxy service node may move a group of those domains to separate IP addresses (e.g., "example1.com" and "example2.com" may be moved to resolve to the same IP address and "example3.com" may resolve to a different IP address). The proxy service node may cause those domains to resolve to the different IP addresses by causing the DNS records for those domains to be changed. For example, if the domains "example 1.com," "example2.com," and "example3.com," each resolve to the IP address 1.2.3.4, the proxy service node may cause the domains "example 1.com" and "example2.com" to resolve to the IP address 1.2.3.5, by transmitting a DNS record update 185 or 186 to the DNS system 140 that reflects the change. If CNAME records are used to point to the proxy server, the CNAME records may be changed to point to correspond with a different IP address of the proxy server 120. Regardless of the format used (e.g., whether the domain directly resolves to an IP address of the proxy server through an address record (e.g., an A or AAAA record) or through one or more CNAME records), the record(s) are changed so that at least those domains that are being scattered ultimately resolve to different IP address(es).

Flow moves from operation 620 back to operation 610. Moving the domains to different IP addresses helps protect against those domains that are not being attacked from being affected by those domain(s) that are being attacked. In addition, scattering those domains to different IP addresses may narrow down which domain is the target of the attack. Some DoS attacks will follow the DNS record(s) change. For example, a DoS attack that is domain-based will typically follow a change to the DNS record to point to a new IP address. By way of specific example, if the domain "example 1.com" was being attacked with a domain-based attack, the attack will typically stop attacking the old IP address (1.2.3.4) and start attacking the new IP address (1.2.3.5). However, some DoS attacks are IP-based. In those cases, the attacks will not follow a change in the DNS record to point to a new IP address, even if their original intention was to attack a domain such as "example1.com."

The operations described with respect to operations 610 to 620 may be performed until the domain that is being attacked and/or the IP address that is being attacked is identified. Alternatively, the operations may be performed a number of times or until there is a relatively small number of possible targeted domains.

At operation 625, the proxy service node performs one or more actions to mitigate the attack. As previously described, the mitigation action(s) may include rate limiting, broadcasting the filtering rules to network equipment (e.g., routers, switches, etc.) in the WAN upstream and/or downstream, null routing the targeted IP address (e.g., after moving the domain to a different IP address), blocking the source IP address (the source IP address of an attacking computing device), changing the routing such that traffic for that IP address points to a particular data center or hardware device that is dedicated to handling attacks, presenting one or more challenges to visitors, increasing the amount of resources and/or the types of resources being cached for the targeted domains, and/or increasing the cache time for the resources being cached for the targeted domains.

By way of a specific example, the proxy service node may null route the targeted IP address, typically after moving the domain(s) that resolve to that IP address to different IP address(es) (e.g., after the DNS records have changed such that those domain(s) resolve to a different IP address). As another example, the proxy service node may rate limit the incoming traffic directed to the IP address such that the traffic that is received at the corresponding origin server is reduced. Rate limiting may include slowing down the rate at which requests are transmitted from the proxy server 120 to an origin server 130, reducing the number of TCP connections, limiting the maximum number of packets per second, etc.

In a specific example, the proxy service node may rate limit or block traffic for all visitors of a domain that may be under attack until a visitor and/or the visitor's browser completes a challenge. A successful response to a challenge is an indication that the visitor's client device is not part of a botnet. The challenge may be, for example, a link to select on a page presented to the visitor; an image, audio, or other form of CAPTCHA; and/or a ping back from anti-virus software after it has scanned or cleaned the visitor's machine. Upon successfully completing the presented challenge, then that visitor may be able to access the corresponding origin server without being rate limited. In one embodiment, the length of time that a visitor may go without being challenged may be restricted to a limited period of time, which may be set on a visitor-by-visitor basis.

As another example, the challenge may be embedded into a client-side script such as JavaScript or a plugin (e.g., a Flash plugin) that is intended to be executed by a browser of the client device, and inserted into an interstitial page. For example, the page may be a lightweight page generated by the proxy server, without a request being transmitted to the origin server. The challenge may be a relatively computationally expensive math problem that should take a few seconds to solve. Since most DoS attacks are launched by a script or other automated bot and not launched by a browser that is capable of executing client-side scripts or plugins, they will not be able to successfully complete the challenge, and therefore a request will not be sent to the origin server.

As another example, the proxy server may try to open a non-web port and have the connection be established over the non-web port. If the client network application is not a browser, it will not be able to open the non-web port and the connection will fail, thereby preventing a request from a client device from reaching the origin server.

In some embodiments, the proxy server 120 causes traffic to a DoS target to be directed to a computing device that is dedicated to handling attacks. For example, assuming that the domain "example.com" has been identified as the target, the proxy server 120 may cause the traffic destined for "example.com" to be received at the dedicated DoS device 190. In one embodiment, the proxy server 120 may cause the domain record(s) for "example.com" to point to an IP address of the dedicated DoS device 190. In another embodiment, upon receipt of traffic destined to "example.com", the proxy server 120 automatically routes that traffic to the dedicated DoS device 190.

A DoS attack may overwhelm typical networking devices that are not designed to handle the large amount of traffic that may be received due to the attack. For example, networking devices allocate memory and processing resources for each packet that is received as well as attempt to process each packet. A typical networking device may not have a large enough packet buffer to handle all of the packets that may be received in a DoS attack. Once the packet buffer is full, additional packets may not be accepted into the device, even if they are legitimate packets (i.e., not part of the DoS attack). As another example, the operating systems of most networking devices use interrupts for the processor to receive data to process. With a heavy load that is common in a DoS attack, the operating system may be using most of its resources handling the interrupts (e.g., saving/restoring state, switching contexts, cache handling, etc.) and not processing the traffic at the application level.

In some embodiments, the dedicated DoS device 190 may be specifically configured to handle DoS attacks. For example, the dedicated DoS device 190 may have a particularly large network connection (a large amount of bandwidth) and/or be particularly robust to handle the attack. For example, the dedicated DoS device 190 may have network card(s) with a relatively large buffer (typically larger than conventional network devices) to store a relatively large amount of packets. The dedicated DoS device 190 may also have extra processing units, larger memory, etc., to handle the number of packets that are received during a DoS attack.

The dedicated DoS device 190 may include an operating system that, instead of using interrupts to receive data to process, periodically polls the buffer to receive packets to process at a regular interval. For example, on a regular cycle such as in coordination with the standard pipeline of the processor, the data may be polled and processed. This allows consistent processing of traffic (e.g., every ten milliseconds fetch more data and put it into the standard pipeline) and allows the operating system to function efficiently and be less affected by a large spike in received packets. The dedicated DoS device 190 may also include an operating system that is designed to quickly filter out illegitimate packets. In some embodiments, the proxy server(s) 120 may also include a relatively large buffer to store packets and/or include an operating system that polls the buffer for packets.

In some embodiments, the proxy server automatically increases the amount of resources, the types of resources that it caches for the attacked domain(s) during an attack, and/or the length of time resources are cached for the attacked domain(s). For example, when not experiencing a DoS attack, a domain owner may choose to have only static files cached by the proxy server(s) 120 (e.g., images, etc.) (e.g., which may be reflected in the caching rules 530). During a DoS attack, the proxy server may automatically increase the amount of resources, the types of resources being cached for the attacked domain(s), and/or the length of time that resources are cached. For example, more dynamic resources may be cached (e.g., HTML pages that may change relatively frequently) than would otherwise be. It should be understood that increasing the level of caching on the proxy server reduces the traffic received at an origin server, since the proxy server may be able to locally respond to a request without having to query the origin server. This may be particularly beneficial for those domain owner(s) whose domains are hosted on servers with limited resources.

Although not illustrated in FIG. 6, in some embodiments, after identifying the domain of the attack to one or more domains, the proxy service node may cause those other domains that were scattered to be clustered back together and share the same IP address, as described with respect to FIG. 3 previously described herein.

Visitor Probability Maps

In embodiments where there are multiple proxy service nodes that are geographically distributed and an anycasted IP address points to those proxy service nodes, the service may generate and use a regional IP address space such that each of those nodes may include a list of IP addresses and/or IP address ranges that it probably should not be receiving traffic from, depending on the region. For example, if there is a proxy service node in California and a proxy service node in China anycasted to the same IP address (e.g., 1.2.3.4), it is unlikely that the proxy service node in California should receive traffic from an IP address that has been known to be located in China, and similarly it is unlikely that the proxy service node in China should receive traffic from an IP address that has been known to be located in California.

Each proxy service node in a specific geographic region may have a list of IP addresses and/or IP ranges that it probably should not accept traffic from. For example, the router(s), proxy server(s), or other components at the proxy service node may have the list of IP addresses and/or IP ranges that it should not accept traffic from. In one embodiment, these lists are generated based on IP geolocation databases. In another embodiment, these lists are generated based on historical analysis of IP addresses and the proxy service nodes that have previously encountered those IP addresses (the proxy service nodes may log the IP addresses of its visitors), in addition to, or in lieu of, using IP geolocation databases. For example, if traffic from an IP address is routinely received at a proxy service node in California, it is unlikely that traffic from that IP address would legitimately be received at the proxy service node in China.

In one embodiment, the service uses legitimate traffic to build a probability map of the likelihood of a packet from an IP address and/or IP address range being received at any one of the anycasted proxy servers. For example, the probability map may be built from logs of the legitimate traffic received at the proxy servers under normal circumstances (not under DoS attacks) (e.g., from the logs of legitimate web traffic received at the proxy servers).

For example, in a specific embodiment, a centralized server may receive from each proxy server across the proxy service nodes one or more messages that indicate the source IP addresses of packets that are received at that proxy server that are being directed to the same IP address (e.g., information from the logs of the proxy servers that are received under normal circumstances). Alternatively, the centralized server may pull the data from the logs of the proxy server(s). The centralized server determines, based on these message(s), a likelihood of a packet having a particular source IP address being legitimately received at each of the proxy servers. The centralized server then transmits, to the proxy servers, a message that indicates which source IP addresses of packets are not likely to be legitimately received at that proxy server. The message may specify those source IP addresses (or range of IP addresses) that are not likely to be legitimately received and/or are likely to be legitimately received at the proxy server.

The centralized server may also transmit a set of rules to the proxy servers to rate limit and/or block packets received with source IP addresses that are not likely to be legitimately received by that proxy server.

In one embodiment, a client-side script (e.g., JavaScript) is inserted in the pages as they flow through the proxy servers to build and/or modify the probability maps in a more secure way. For example, prior to delivering the page to the requesting client device, the proxy server 120 inserts the client-side script into the page and delivers the modified page to the requesting client device. The client-side script, when executed, causes a packet to be transmitted to a domain associated with the service, which will be received at the nearest proxy server according to the anycast protocol and logged (that is, the source IP address of the packet is logged as being received at that particular proxy server). In one embodiment, only the logs that are generated as a result of this client-side script are used when generating the probability map. Use of the client-side script limits the risk of attack traffic polluting the logs since most devices that are used in a DDoS attack are not capable of executing client-side scripts.

In one embodiment, depending on the level of granularity desired, networks can be grouped by Classless Inter-Domain Routing (CIDR) and assigned a probability for the entire IP range. For example, the IP address range 1.1.0.0/16 (which represents the IP addresses 1.1.0.0-1.1.255.255) may belong to a single organization (e.g., an Internet Service Provider) located primarily in North America and thus have a high probability of connecting to any of the proxy servers in North America and a low probability of connecting to any of the proxy servers outside of North America. In a specific embodiment, the grouping by CIDR block may begin with a particular block (e.g., /16 block) and over time be grouped with a larger number of IP addresses (e.g., /15 block, to /14 block, to /13 block, etc.), thereby conserving memory and maximizing rule space on the proxy servers. As another example, the probability may be at the individual IP address level.

Using the generated probability map, the service sets may set rules in the proxy servers and/or routers to drop or rate limit the number of packets received from an IP address in an abnormal region (one that it has low probability of receiving traffic from). In one embodiment, the lower the probability of receiving traffic at a particular proxy server, the higher the rate limiting. In some cases, if the probability is below a threshold, packets from that IP address or range of IP addresses would be dropped at the proxy server.

Network events, including internal events such as taking a proxy server offline and/or external events that change the underlying routing such as a major network provider suffering an outage, affect the probabilities. Because of this, in one embodiment, the service includes a way to remove all rate limits temporarily and/or remove rate limits for parts of the network that are affected by the network event. For example, the control server 125 may provide an interface to allow a domain owner to remove the rate limits that are being applied to its domain(s), which may be to a particular network. As another example, administrators of the service may remove the rate limits temporarily and/or remove rate limits for parts of the network that are affected by the network event.

Although the detection and mitigation mechanisms described herein detect and mitigate a large amount of DoS attacks, some illegitimate traffic may reach the origin servers. For example, while some attacks include spoofed information that never makes it to the application layer, other attacks are directed at the application itself. These attacks may send legitimate HTTP requests at high volumes, send the requests at normal volumes and then are slow to read the responses, initiate a connection and then send the request very slowly, or some other method that has the intention of overwhelming the origin server's resources. In some embodiments, the service allows a customer (e.g., a domain owner) to specify that they are under attack or that they want a heightened level of security for their website, which will cause the cloud-based proxy service to add additional set of protections to stop potentially malicious HTTP traffic from being passed to their origin server.

For example the customer may have a website that is experiencing a slow response time, a high CPU load, etc., which may lead the customer to believe that they are under a DoS attack. After identifying to the cloud-based proxy service that they are under attack or that they want additional security protections, the service puts them into a heightened-security mode, which is referred herein as "under attack mode."

In one embodiment, the service may enable the under attack mode for a domain if an administrator detects an attack or the proxy servers receive an abnormally high amount of requests to the domain. In one embodiment, the service enables the under attack mode for all visitors (and thus all requests for that domain will be subject to the under attack mode). In another embodiment, the service enables the under attack mode for only those visitors whose threat score exceeds a certain threshold (e.g., the under attack mode may only be applied for requests from IP addresses that have previously been known to be involved in malicious behavior).

In one embodiment the under attack mode includes challenging each requesting visitor. For example upon receiving an HTTP request for a resource (e.g. example.com/index.html), the proxy server 120 returns a resource that includes a set of one or more challenges. Since most denial of service attacks are generated by a script or other automated bot, they are typically not performed by a browser that is capable of executing the client-side scripts such as JavaScript or being able to execute plugins (e.g., Flash). The proxy may send a challenge to the requesting client device that an attacker (e.g., a script or automated bot) is unlikely to be able to solve but a legitimate client device (e.g., typical web browsers) can solve easily. By way of a specific example, the challenge may be computationally expensive to solve and/or requires a client-side script (e.g., JavaScript, etc.) or a plug-in (e.g., Flash, Java applet, etc.) to execute to solve. For example, this could be a math problem that takes approximately 5 seconds to solve on average. Since his most attacks are performed by a script or bot, they will not be able to complete the problem and they will not pass the challenge, and the request will not be received at the origin server.

However, most client network applications (e.g., browsers) will be able to complete the challenge and therefore the request will not be blocked. The challenge may also require input from the user (e.g., an image, audio, or other form of CAPTCHA, or be asked to answer simple math or trivia questions, or any combination of the above). If the challenge is passed, then a cookie is set (referred herein as a "pass cookie") and the client network application will not be challenged again for a period of time that may be configurable by the domain owner.

The user who is running a browser, may see a timer or other indication that indicates that there is currently a security test being performed and for them to wait. A successful response may be embedded into a cookie. In some embodiments, the cookie may be a value that is stored on the proxy server. In other embodiments, the cookie is a self expiring hash of the client's IP address. For example, a modulo operation can be applied to IP address and the current time (e.g., UTC time) and the result being hashed and set as a cookie. The proxy server could then determine whether the IP address matched and whether it is in the time range of the modulo in order to successfully pass the test. If the challenge is passed, the proxy server may then deliver the requested network resource. It should be understood that the proxy server may need to retrieve the requested network resource from the origin server. Alternatively, the cookie could contain only a portion of the source IP address. For example, if the IP address of the visitor is 1.1.1.1, then a cookie hash may be set as 1.1.1+ salt, where only the first three octets of the IP address of the hash are tested. This may be useful for Internet Service Providers that bounce connections between multiple IP addresses within a /24 block (or other range of IP addresses).

Figure 7:
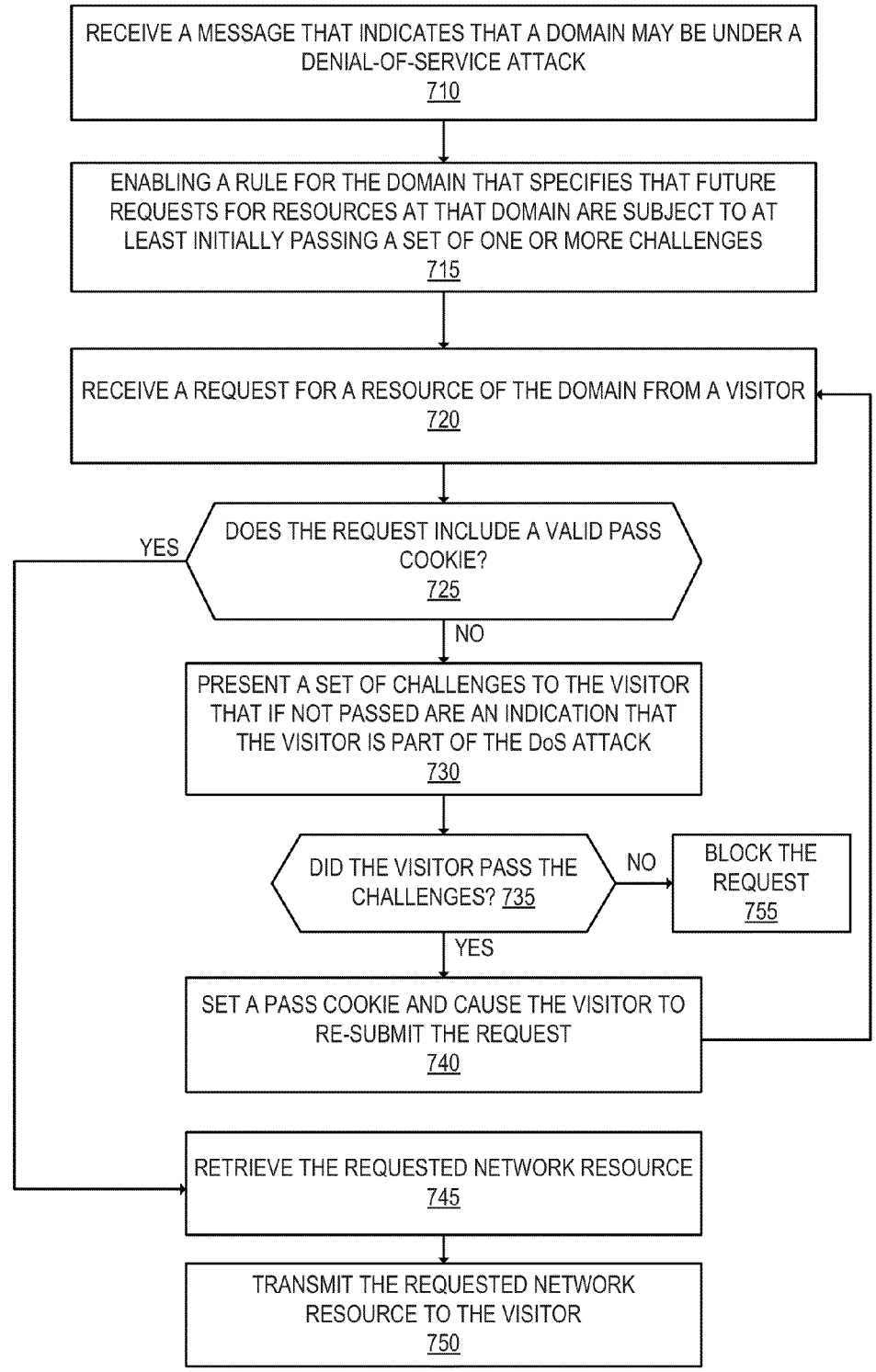
FIG. 7 is a flow diagram that illustrates exemplary operations on a proxy server for the heightened security mode according to one embodiment.

FIG. 7 is a flow diagram that illustrates exemplary operations on a proxy server for the heightened security mode according to one embodiment. At operation 710, the proxy server receives a message that indicates that a domain may be under a DoS attack. Typically the DoS attack is a DDoS attack. For example, in one embodiment, a domain owner may use an interface of a control server 125 to specify that one or more of their domains are under a DoS attack. FIG. 8 illustrates an exemplary interface that allows a domain owner to indicate that they are under attack and would like to be in the heightened security mode. In one embodiment, the interface 810 is an interface available on a control server 125 and available over the Internet to registered customers. The interface 810 allows the customer to select from different levels of security (e.g., I'm under attack, high, medium, low, essentially off, etc.), which will be automatically applied to the customers website. For example, in response to a selection of a security level (e.g., "I'm under attack") the control server 125 may transmit the security rules 178 to the proxy server(s) 120, which reflect the customers security configuration (these rules may then be stored in the security rules 525 of the proxy server(s)). The different levels of security may determine the response of the service during an attack. For example, a low security setting may challenge only those visitors that may be sending large amounts of traffic or have a relatively high threat score, for example. As will be described in greater detail, the "I'm under attack" mode presents a set of challenges to each visitor. The interface 810 allows the user to indicate that they are under attack, by using the drop down button 815. The "I'm under attack" mode is typically only used when the visitor believes that their website is under a DoS attack. After selecting the "I'm under attack" mode, the rule will be automatically applied to the proxy server(s) 120 (e.g., the control server 125 will transmit the rule to the proxy server(s) 120 as a form of the security rules 178 which installs the rule for the customer's domain).

As another example, the service may enable the under attack mode for a domain and cause the message to be transmitted to the proxy server. For example, an administrator may detect the DoS attack and cause a message to be transmitted from the control server to the proxy server. As another example, the service may enable the under attack mode when the proxy server(s) of a domain receive an abnormally high amount of requests to the domain.

After receiving the message, flow moves to operation 715 where the proxy server enables a rule for the domain that specifies that future requests for resources at that domain are subject to at least initially passing a set of one or more challenges. For example, the proxy server enables the rule for the domain in the security rules 525. In one embodiment, enabling the rule for the domain will cause each visitor to that website to receive an interstitial page for an amount of time (e.g., five seconds) while the proxy server determines whether the visitor is likely to be part of the DoS attack based on visitor request patterns. For example, the proxy server may determine a likelihood of whether the visitor is a legitimate human (which typically would not be part of a DoS attack) or a bot (which may be part of the DoS attack). Flow moves from operation 715 to operation 720.

At operation 720, the proxy server receives a request for a resource of the domain from a visitor (e.g., an HTTP request). As previously described, the proxy server may receive this request as a result of the domain resolving to the proxy server. Flow then moves to operation 725, which is optional in some embodiments in which case flow would move to operation 730. At operation 725, the proxy server determines whether the request includes a valid pass cookie, which indicates that the visitor has passed the set of challenges. Setting a pass cookie will be described with respect to operation 740. If the request does not include a valid pass cookie then flow moves to operation 730. If the request includes a valid pass cookie, then flow moves to operation 745.

At operation 730 (the request does not include a valid pass cookie), the proxy server presents a set of challenges to the visitor which if not passed are an indication that the visitor is part of the DoS attack. In one embodiment, the set of challenges includes a client-side script that, when executed by the client network application (if that client network application supports execution of client-side scripts), allows the proxy server to determine a likelihood of whether the request originated from a web browser, which is an indication that the visitor is not part of the DoS attack. As described above, most scripts or bots that are part of DoS attacks are not web browsers and are not capable of executing client-side scripts. The client-side script, when executed, may solve a computation such as a math problem and submits the answer, which is received by the proxy server. In one embodiment, the client-side script is embedded into an interstitial page (referred herein as a "challenge page") and served locally by the proxy server (meaning that a request for the page is not transmitted to the origin server). The challenge page may not have the same styles (e.g., CSS styles) or otherwise be formatted in connection with the requested page.

Figure 9:
FIG. 9 illustrates an exemplary challenge page that is displayed to a visitor upon a domain owner specifying that they are under attack according to one embodiment.

FIG. 9 illustrates an exemplary challenge page that is displayed to a visitor upon a domain owner specifying that they are under attack according to one embodiment. By way of example, the domain owner of "example.com" has configured the security rule for "example.com" to be in "I'm under attack" mode. In one embodiment, the page 910 is a lightweight page that is not necessarily reflective of the styles or format of the requested page. In other embodiments, the challenge page may have the same styles (e.g., CSS styles) or otherwise be formatted in connection with the requested page. Although not visible on the page 910, a client-side script has been inserted into the code of the page that is executed to determine a likelihood of whether the visitor is a web browser. For example, the client-side script executes a math problem that typically cannot be solved by an automated bot or script, but typically can be solved by a web browser.

Figure 10:
FIG. 10 illustrates an exemplary page that is displayed to a visitor when client-side scripting (in this example JavaScript) is not enabled when in the heightened security mode, according to one embodiment.

Since the client-side script (e.g., a JavaScript) is embedded into the code of the challenge page 910, if client-side scripting is not enabled (e.g., if the user has disabled JavaScript), then the browser will not pass the challenge. However, some legitimate visitors may simply have disabled the execution of client-side scripts on their browsers. To prevent against this, in one embodiment the detects whether client-side scripting (e.g., whether JavaScript is enabled), and if it is disabled, displays a message to the visitor to enable client-side scripting and reload the page. For example, FIG. 10 illustrates an exemplary page 1010 that is displayed to a visitor when client-side scripting (in this example JavaScript) is not enabled.

In addition to, or instead of the client-side script, other challenges may be presented to the visitor in some embodiments. For example, the proxy server may attempt to open a non-Web port and have the request connection with the visitor be established over the non-Web port. If the client network application is not a browser, they will not be able to open the non-Web port. As another example, the proxy server may present a human challenge. For example, the proxy server may transmit a page the visitor with an image, audio, or other form of CAPTCHA, or that requests an answer to a simple math or trivia question, or any combination of the above, to try to determine that the visitor is a human and not a bot. As another example, the proxy server may perform client-side meta-pushes to redirect the page, which typically cannot be done by automated bots that are scripts.

In one embodiment, a client-side meta-push is a tag that is used to force a page to redirect. By way of example, the meta-tag may be in a format similar to the following:

<meta http-equiv="refresh" content="2;url=http://www.example.com">.

In this example, when the page is loaded, the meta-tag instructs the client network application to redirect to www.example.com. This can be performed without the client needing to have a client-scripting language enabled, such as JavaScript. The number "2" indicates to the browser to wait 2 seconds before it does the redirect. In one embodiment, this allows the caching of 2 seconds and only showing the refreshed content after that period has expired, which inherently slows down the number of requests per second.

Referring back to FIG. 7, flow moves from operation 730 to operation 735, where the proxy server determines whether the visitor passed the set of challenges. For example, in the case where the presented set of challenges includes a client-side script that, when executes, causes a message to be sent and received by the proxy server, the proxy server may compare that message with an expected value to determine whether the visitor passed the challenge. As a specific example, if the client-side script executes a math problem, the message will include the answer to the math problem (e.g., the client-side script may cause a POST request to be transmitted that includes the answer to the math problem). As another example, the proxy server may receive the result of the CAPTCHA, the solution to the math question or trivia question if presented. The proxy server compares these answers to their expected values to determine whether they are correct. If the visitor passed the set of challenges, then flow moves to operation 740. If the visitor did not pass the set of challenges, then flow moves to operation 755. In an embodiment where pass cookies are not used, flow moves from operation 735 to operation 745 upon determining that the visitors passed the set of challenges.

At operation 755, the proxy server blocks the request. As a result, the request will not be transmitted to the origin server thereby saving the resources of the origin server from having to process the request. The proxy server may also log that the visitor has been blocked, which may affect the threat score applied to the visitor. In one embodiment, if the visitor exceeds a number of failures in a particular time period (e.g., 24 hours), requests from that visitor to the domain will be blocked for a period of time without presenting the set of challenges.

At block 740, the proxy server sets a pass cookie and causes the visitor to re-submit the request (e.g., the proxy server transmits a response with a redirection code to the visitor). In one embodiment, the pass cookie may be a value that is stored on the proxy server. In other embodiments, the pass cookie is a self expiring hash of the visitor's IP address. For example, the pass cookie may include a hash of the source IP address and a secret salt of the visitor. Using a hash of the source IP address in the pass cookie helps prevent the cookie from being used across multiple browsers since they will typically have different IP addresses. Alternatively, the pass cookie could contain only a portion of the source IP address. For example, if the IP address of the visitor is 1.1.1.1, then a cookie hash may be set as 1.1.1+ salt, where only the first three octets of the IP address of the hash are tested. As described above, using a pass cookie that contains only a portion of the IP address is useful for Internet Service Providers that bounce connections between multiple IP addresses within a /24 block (or other range of IP addresses). The pass cookie may also include a timestamp which, for a given period of time (e.g., 1 hour), will result in the same hash (but a different hash after that time period). This effectively embeds a TTL in the pass cookie.

Assuming that the visitor re-submits the request (e.g., as a result of a redirect), the proxy server will receive the request again in step 720. The visitor will include the pass cookie in the request. At operation 725, the proxy server 120 determines whether the request includes a valid pass cookie. For example, the proxy server performs the same hash function with the IP address (or portion of the IP address) that was used to set the cookie and the current time. If the two match, then the pass cookie is valid and the request can pass through unchallenged (without being presented with a challenge page) until the pass cookie TTL expires. If a pass cookie is used after it has expired, then the expiring timestamp will result in a different hash. By using an expiring hash, the proxy server is able to validate the cookies without having to do a lookup for a valid cookie. If the request includes a valid pass cookie, then flow moves to operation 745; otherwise it moves to operation 730.

At operation 745, the proxy server retrieves the requested network resource. In one embodiment, if the requested resource is not in the local cache of the proxy server or the cached resource has expired, the proxy server requests the resource from the origin server. Upon receiving the request from the origin server, the proxy server may store the resource in its cache. If the requested resource is in the local cache of the proxy server and it is not expired, the proxy server may use that resource when responding to the request of the visitor. Flow then moves to operation 750 where the proxy server transmits the requested network resource to the visitor.

FIG. 11 illustrates exemplary code for a page where a client-side script has been inserted that determines a likelihood of whether the visitor is a browser. The code includes the client-side script 1110, which when executed, solves a relatively simple math problem (3+26*1) and then submits, via a POST, that answer to the backend (via the URL for "example.com") after 5850 milliseconds (about 5 seconds). The proxy server receives the request from that particular source IP address and caches the request for 5860 milliseconds (for example). If a subsequent request is received at the proxy server prior to the time expiring, then the same challenge will be presented to the visitor without testing whether the answer was correct. After the time period of the cache (5860 milliseconds) has expired, the proxy server begins to accept answers to the challenge. If the proxy server receives a correct answer to the challenge, then it sets a pass cookie as previously described. The client-side script also causes the client network application to be redirected to request the content (e.g., example.com) after the time period expires (e.g., after 5850 milliseconds). The client network application will include the pass cookie in the request, which will be received by the proxy server. When the proxy server receives the pass cookie, it performs the same hash function with the IP address (or portion of the IP address) and the current time. If the two match, then the request can pass through unchallenged; meaning that after a client network application has passed the challenge once, it will not be challenged again until the pass cookie TTL expires. If they do not match, then the challenge page (as described above) is returned to the client network application. In this way, only the requests from those client network applications that have successfully completed the challenge (and likely provided that they are legitimate) are forwarded to the origin server. Any client network applications that cannot execute the challenge will not receive the pass cookie.

In an alternative embodiment, the proxy server maintains a lookup table of valid pass cookies that is checked upon each request. If the request includes a cookie that is not valid according to the lookup table, then the request will be dropped by the proxy server.

In one embodiment, the complexity of the challenge may be adjusted depending on the reputation/threat score of the underlying source IP address. For example, in some embodiments, the service assigns visitors a threat score. The threat score may depend on ratings from different domain owners of the service and/or based on properties or actions of the visitors. For example, the service may detect that an IP address belongs to a client device that appears to be infected with a virus; an IP address belongs to a client device that appears to be an automated crawler that does not appear to follow robots.txt and other rules; an IP address belongs to a client device that appears to be an email harvester that harvests emails from websites; an IP address that has been seen posting comment/blog spam, and/or an IP address that has been seen attempting known exploits.

In one embodiment, beyond stopping attackers from sending traffic to the origin server, the challenges can be used to build data on suspect networks (e.g., botnet networks). For example, any visitor (as represented by their source IP address) that has failed a challenge may be marked as a potential threat. Subsequent failures increase the threat score. For example, for each challenge that a browser fails to pass in a particular time period (e.g., 24 hours), the threat score may be increased (e.g., by one point). As another example, more complex algorithms may be used to avoid false positives for legitimate client network applications that do not have client-side scripting enabled, including not increasing the threat score until a certain threshold of failures have occurred. Threat scores may also be decreased for each successful passage of a challenge.

The proxy servers may each update the threat information, which may be collectively used to identify and enumerate botnets. Known botnets with high threat scores can be blocked, without being presented with a challenge. This, effectively, uses the high volume of requests from botnets involved in DDoS attacks against them since with each challenge failure, more information is provided to establish the reputation of the particular network.

As described above, in some embodiments, the service uses the anycast protocol to direct traffic to different geographical proxy service nodes. Also as described above, each proxy service node may service multiple domains at multiple IP addresses. Thus, even though the service may isolate an attack to a particular domain and put that domain on its own IP address, the attack may affect other domains that are being serviced by the same proxy service node (e.g., the resources of that proxy service node may be more heavily used to handle the attack). In some embodiments, after isolating an attack to a particular domain or IP address, and that attack is generally located at a single proxy service node (e.g., the attack is generally being launched from the same region and thus is anycasted to the same node), the service may stop that proxy service node from being a member of the anycast group for other IP addresses than the one that is being attacked. The result is that that proxy service node essentially becomes dedicated to handling the DoS attack directed at the target, which minimizes the amount of collateral damage to other domains that are not the target. When the DoS attack ends or is minimized, that proxy service node may be added back as a member of the anycast group for other IP addresses.

Some DoS attacks are reflection attacks where the true target, or an additional target, is not necessarily the target identified as the destination. For example, a TCP flood attack may include a reflection component. Establishing a TCP connection includes exchanging a set of packets (usually three packets) between the TCP client and server. The first packet is a SYN packet that is sent from the TCP client to the TCP server. The TCP server responds with a SYN/ACK packet to the TCP client, as identified in the original SYN packet. However, some DoS attacks spoof the source IP address of the original SYN packet such that the SYN/ACK packet will be sent to the spoofed source IP address. Thus, the attack may have multiple components, the destination of the SYN packets as well as the source of the SYN packets.

In one embodiment, if a particular domain is experiencing a DoS attack, the proxy service node(s) may stop responding to packets for that particular domain to prevent participation in a reflection attack. For example, if "example.com" is determined to be the target of a DoS attack, the proxy service node(s) may stop responding to packets or rate limit packets of the attack type (e.g., SYN packets) destined for "example.com." In one embodiment, the proxy service node(s) may stop responding to those packets in only the regions in which that domain is experiencing the attack. For example, if the attack is directed at "example.com" and is only being experienced in a China, then the proxy service node(s) serving the Chinese region will stop responding to packets directed at "example.com"; whereas other proxy service node(s) outside the Chinese region will continue to respond to packets directed at "example.com."

In another embodiment, the proxy service node(s) may stop responding to packets or rate limit packets that have a source IP address that appears to be sending an abnormally high amount of traffic. For example, if a DoS attack includes a reflection component, typically there will be an abnormally high number of packets (e.g., SYN packets) that appear to be coming from the same source. For these packets, the proxy service node(s) may stop responding or perform rate limiting while continuing to respond to packets having a different source normally.

As described above, in some embodiments, the incoming traffic is received at a proxy server as a result of a DNS request for a domain resolving to an IP address of that proxy server. For example, DNS record(s) for the domain "example.com" may resolve to an IP address of the proxy server 120. The DNS records may include multiple Address resource records (e.g., multiple A records and/or multiple AAAA records), which associates multiple IP addresses of the proxy server with a particular domain.

In one embodiment, in response to receiving a DNS request for "example.com", the authoritative name server 142 returns multiple Address resource records to the requester, where the multiple Address resource records are selected from a much larger pool of Address resource records. For example, the authoritative name server 142 may return a randomly selected group of five Address resource records from potentially thousand of records for each DNS request. The returned Address resource records may be randomly selected from the pool or selected from a predefined portion of the pool depending on the requested domain.

Figure 12:
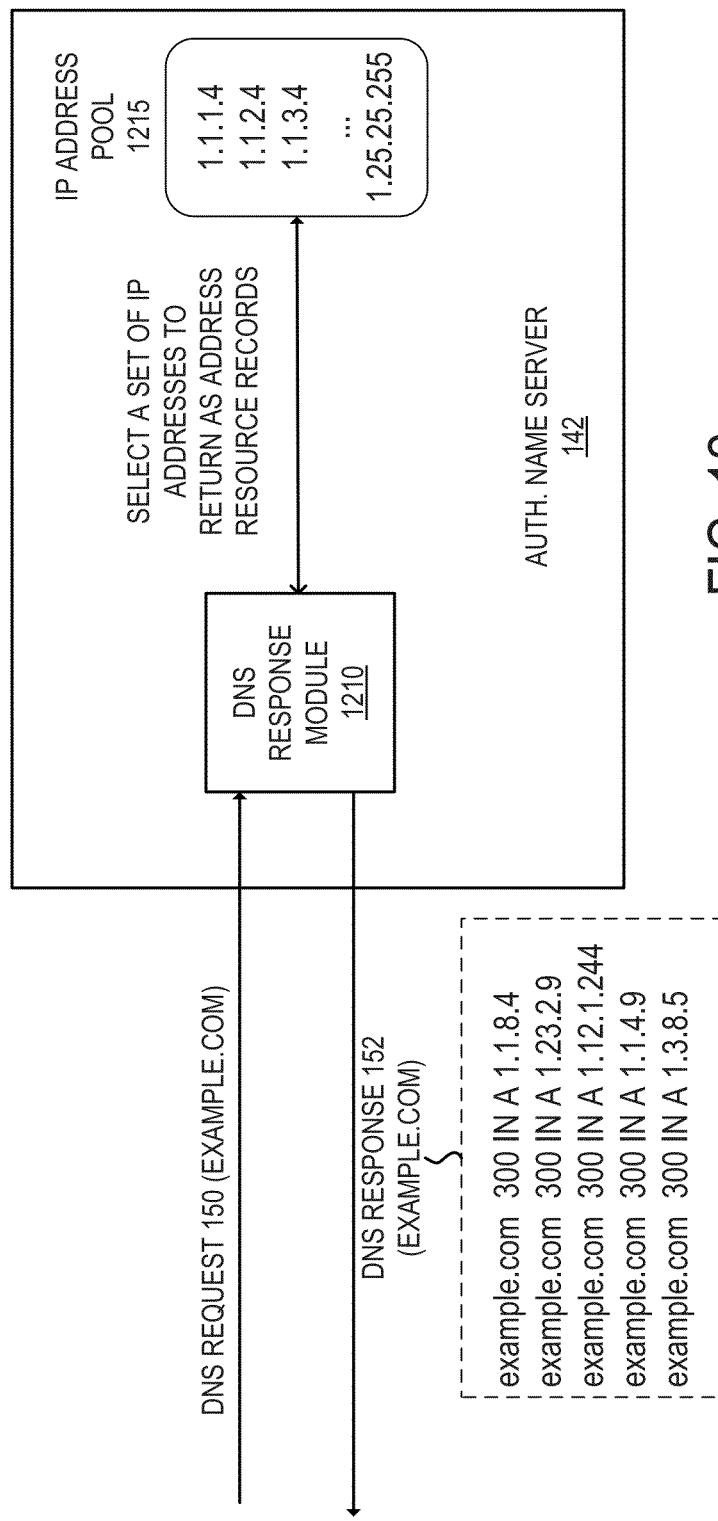
FIG. 12 illustrates an example of the authoritative name server selecting Address resource records to include in a DNS response according to one embodiment.

FIG. 12 illustrates an example of the authoritative name server 142 selecting Address resource records to include in a DNS response according to one embodiment. The authoritative name server 142 includes the DNS response module 1210 that receives the DNS request 150. For purposes of this example, the DNS request 150 is requesting DNS records for the domain example.com. The DNS response module 1210 selects IP addresses from the IP address pool 1215 to include in the DNS response 152 for eample.com. The IP address pool 1215 includes different IP addresses that may be selected and returned in the DNS response 152 for the domain example.com. For example, as illustrated in FIG. 12, the IP address pool 1215 includes a range of addresses from 1.1.1.4-1.25.25.255. As illustrated in FIG. 12, the DNS response 152 for example.com includes 5 A records.

In one embodiment, the DNS response module 1210 randomly selects the IP addresses that are to be included in the DNS response 152 for example.com. In such an embodiment, the DNS response module 1210 will randomly select the IP addresses for the DNS response for each request for example.com it receives. Thus, it is likely that two different requesters will receive different Address resource records. In another embodiment, the DNS response module 1210 selects the IP addresses that are to be included in the DNS response 152 for example.com differently (e.g., round-robin).

Selecting the IP addresses that are to be returned in the DNS response from a relatively large pool of IP addresses creates a coordination problem for attackers. For example, if each node in a DDoS attack selects one of the many different IPs that may be returned for the domain, then the attack inherently will be spread across a wider surface area and will be easier to mitigate. For example, each of these IP addresses may be rate limited such that the number of connections to the domain will be limited to its historical normal level (e.g., if there are 1,000 IP addresses that may be returned for the domain, the those 1,000 IP addresses may be set to rate limit the number of connections to approximately the domain's historical normal traffic level divided by 1,000). On the other hand, if the attacker selects a single IP address to target, then that IP address can be rate limited, blocked, etc.

Figure 13:
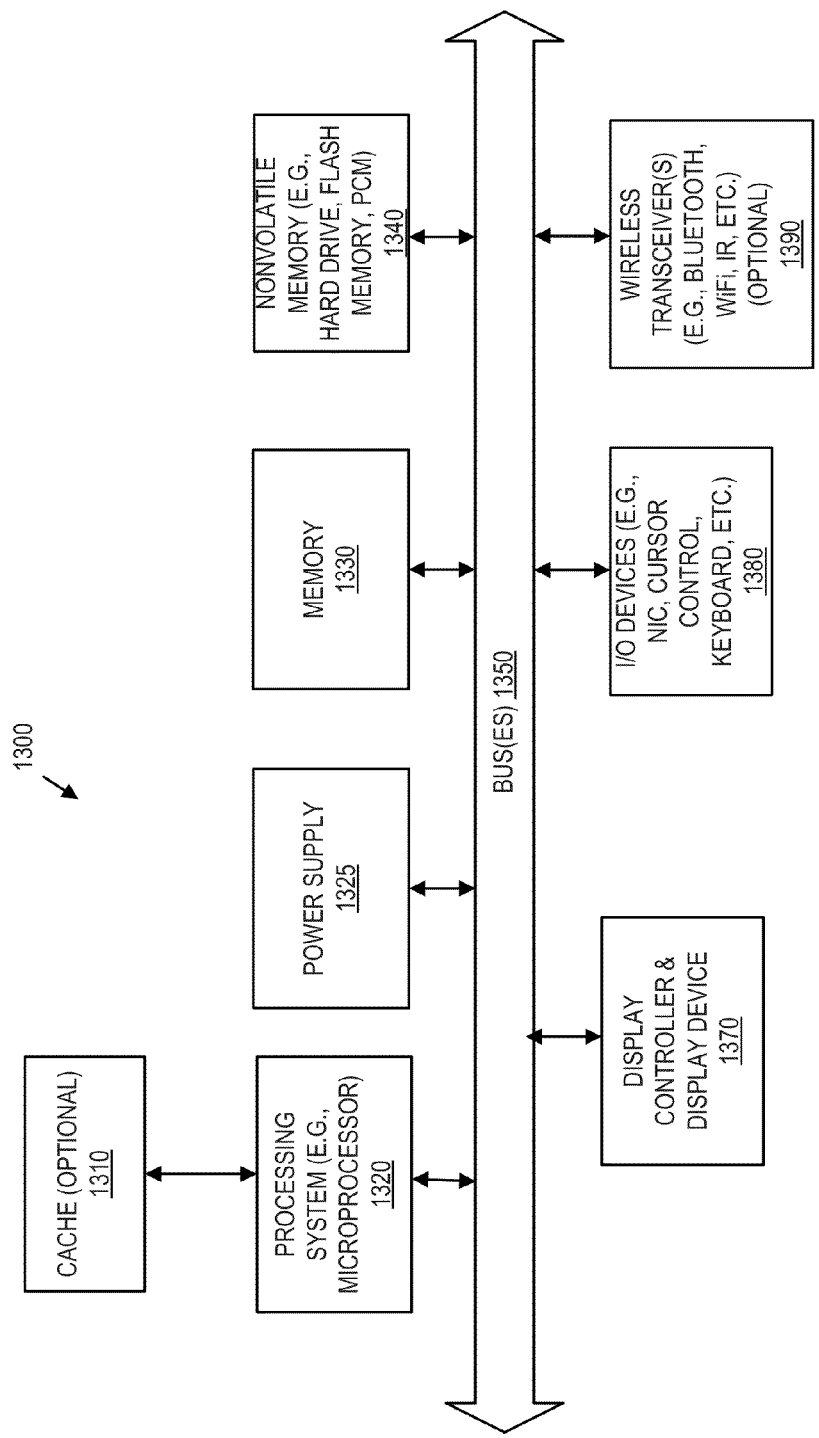
FIG. 13 illustrates an exemplary format of a computer system of devices of the cloud-based proxy service according to one embodiment.

As illustrated in FIG. 13, the computer system 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1350 may be connected to each other through various bridges, controllers, and/or adapters as is well known in the art. The processing system 1320 may retrieve instruction(s) from the memory 1330 and/or the nonvolatile memory 1340, and execute the instructions to perform operations described herein. The bus 1350 interconnects the above components together and also interconnects those components to the display controller & display device 1370, Input/Output devices 1380 (e.g., NIC (Network Interface Card), a cursor control (e.g., mouse, touchscreen, touchpad, etc.), a keyboard, etc.), and the optional wireless transceiver(s) 1390 (e.g., Bluetooth, WiFi, Infrared, etc.). In one embodiment, the client devices 110A-I, the control server(s) 125, the proxy server(s) 120, and/or the origin servers 130A-L can take the form of the computer system 1300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for determining a likelihood of a packet having a particular source address being received at a particular one of a plurality of proxy servers that are anycasted to a same IP address, wherein the proxy servers are part of a cloud-based proxy service and are situated between a plurality of client computing devices accessing network resources and a plurality of origin servers that serve network resources, the method comprising:

receiving, from each of the plurality of proxy servers, one or more messages that indicate source IP addresses of packets received at that proxy server that are directed to the same IP address, wherein the proxy servers receive traffic at the same IP address as a result of one or more domains resolving to the same IP address; and wherein a particular one of the proxy servers receives packets directed to the same IP address as a result of an anycast protocol implementation selecting that particular one of the proxy servers as the closest in terms of routing protocol metric used to route traffic to the proxy servers;

determining, based on the one or more messages from each of the plurality of proxy servers, a likelihood of a packet having a particular source IP address being legitimately received at each of the proxy servers;

transmitting, to each of the proxy servers, a message that indicates which source IP addresses of packets are not likely to be legitimately received at that proxy server.

2. The method of claim 1, wherein the message transmitted to each of the proxy servers includes a set of rules to rate limit packets received with source IP addresses that are not likely to be legitimately received by that proxy server.

3. The method of claim 1, wherein the message transmitted to each of the proxy servers includes a set of rules to block packets received with source IP addresses that are not likely to be legitimately received by that proxy server.

4. The method of claim 1, wherein the message transmitted to each of the proxy servers specifies the source IP addresses of packets that are likely to be legitimately received at that proxy server.

5. The method of claim 1, wherein the message transmitted to each of the proxy servers specifies the source IP addresses of packets that are not likely to be legitimately received at that proxy server.

6. The method of claim 1, wherein the step of receiving from each of the plurality of proxy servers the one or more messages that indicate source IP addresses of packets received at that proxy server that are directed to the same IP address, occurs only when the same IP address is not believed to be currently under a denial of service (DoS) attack.

7. The method of claim 1, wherein the one or more messages received from each of the plurality of proxy servers further indicates a number of packets of each source IP address received at that proxy server.

8. The method of claim 1, wherein the one or more messages are received as a result of a client-side script that is inserted by the proxy servers into web pages of domains that resolve to the same IP address, wherein the client-side script, when executed, causes a packet to be transmitted to the same IP address.

9. The method of claim 1, further comprising:

responsive to a network event that affects the likelihood of a packet having a particular source IP address being legitimately received at each of the proxy servers, transmitting a message to the proxy servers that indicates a suspension of any rate limits that have been installed as a result of transmitting the messages to the proxy servers that indicate which source IP addresses of packets are not likely to be legitimately received at the proxy servers.

10. An apparatus, comprising:

a plurality of proxy servers that are anycasted to a same IP address, wherein each of the plurality of proxy servers is configured to perform the following:

receive packets at the same IP address as a result of one or more domains resolving to the same IP address, wherein this proxy server receives the packets at the same IP address as a result of an anycast protocol implementation selecting this one of the plurality of proxy servers as the closest in terms of routing protocol metric used to route traffic to the plurality of proxy servers;

transmit one or more messages to a central server that indicate source IP addresses of the received packets; and receive, from the central server, a message that indicate source IP addresses of packets that are not likely to be legitimately received at that proxy server; and install, based on the received message, one or more rules to rate limit packets that are received having a source IP address that is not likely to be legitimately received at that proxy server; and the central server coupled with the plurality of proxy servers, wherein the central server is configured to perform the following:

receive, from each of the plurality of proxy servers, the one or more messages that indicate source IP addresses of the received packets;

determine, based on the one or more messages received from the plurality of proxy servers, a likelihood of a packet having a particular source IP address being legitimately received at each of the proxy servers; and transmit, to each of the proxy servers, the message that indicates which source IP addresses of packets are not likely to be legitimately received at that proxy server.

11. The apparatus of claim 10, wherein the message transmitted to each of the proxy servers includes a set of rules to rate limit packets received with source IP addresses that are not likely to be legitimately received by that proxy server.

12. The apparatus of claim 10, wherein the message transmitted to each of the proxy servers includes a set of rules to block packets received with source IP addresses that are not likely to be legitimately received by that proxy server.

13. The apparatus of claim 10, wherein the message transmitted to each of the proxy servers specifies the source IP addresses of packets that are likely to be legitimately received at that proxy server.

14. The apparatus of claim 10, wherein the message transmitted to each of the proxy servers specifies the source IP addresses of packets that are not likely to be legitimately received at that proxy server.

15. The apparatus of claim 10, wherein the proxy servers are configured to transmit the one or more messages to the central server that indicate source IP addresses of the received packets only when the destination IP address of those packets is not believed to be currently under a denial of service (DoS) attack.

16. The apparatus of claim 10, wherein the one or more messages to be transmitted by each of the proxy servers further indicates a number of packets of each source IP address received at that proxy server.

17. The apparatus of claim 10, wherein the one or more messages to be transmitted by each of the proxy servers are to be transmitted as a result of a client-side script that is inserted by the proxy servers into web pages of domains that resolve to the same IP address, wherein the client-side script, when executed, causes a packet to be transmitted to the same IP address.

18. The apparatus of claim 10, further comprising:

responsive to a network event that affects the likelihood of a packet having a particular source IP address being legitimately received at each of the proxy servers, transmitting a message to the proxy servers that indicates a suspension of any rate limits that have been installed as a result of transmitting the messages to the proxy servers that indicate which source IP addresses of packets are not likely to be legitimately received at the proxy servers.

19. A non-transitory computer-readable storage medium that provides instructions that, if executed by a processor, will cause said processor to perform operations for determining a likelihood of a packet having a particular source address being received at a particular one of a plurality of proxy servers that are anycasted to a same IP address, wherein the proxy servers are part of a cloud-based proxy service and are situated between a plurality of client computing devices accessing network resources and a plurality of origin servers that serve network resources, the operations comprising:
   receiving, from each of the plurality of proxy servers, one or more messages that indicate source IP addresses of packets received at that proxy server that are directed to the same IP address, wherein the proxy servers receive traffic at the same IP address as a result of one or more domains resolving to the same IP address; and wherein a particular one of the proxy servers receives packets directed to the same IP address as a result of an anycast protocol implementation selecting that particular one of the proxy servers as the closest in terms of routing protocol metric used to route traffic to the proxy servers;
   determining, based on the one or more messages from each of the plurality of proxy servers, a likelihood of a packet having a particular source IP address being legitimately received at each of the proxy servers;
   transmitting, to each of the proxy servers, a message that indicates which source IP addresses of packets are not likely to be legitimately received at that proxy server.

20. The non-transitory computer-readable storage medium of claim 19, wherein the message transmitted to each of the proxy servers includes a set of rules to rate limit packets received with source IP addresses that are not likely to be legitimately received by that proxy server.

21. The non-transitory computer-readable storage medium of claim 19, wherein the message transmitted to each of the proxy servers includes a set of rules to block packets received with source IP addresses that are not likely to be legitimately received by that proxy server.

22. The non-transitory computer-readable storage medium of claim 19, wherein the message transmitted to each of the proxy servers specifies the source IP addresses of packets that are likely to be legitimately received at that proxy server.

23. The non-transitory computer-readable storage medium of claim 19, wherein the message transmitted to each of the proxy servers specifies the source IP addresses of packets that are not likely to be legitimately received at that proxy server.

24. The non-transitory computer-readable storage medium of claim 19, wherein the step of receiving from each of the plurality of proxy servers the one or more messages that indicate source IP addresses of packets received at that proxy server that are directed to the same IP address, occurs only when the same IP address is not believed to be currently under a denial of service (DoS) attack.

25. The non-transitory computer-readable storage medium of claim 19, wherein the one or more messages received from each of the plurality of proxy servers further indicates a number of packets of each source IP address received at that proxy server.

26. The non-transitory computer-readable storage medium of claim 19, wherein the one or more messages are received as a result of a client-side script that is inserted by the proxy servers into web pages of domains that resolve to the same IP address, wherein the client-side script, when executed, causes a packet to be transmitted to the same IP address.

27. The non-transitory computer-readable storage medium of claim 19, wherein the operations further comprise:
   responsive to a network event that affects the likelihood of a packet having a particular source IP address being legitimately received at each of the proxy servers, transmitting a message to the proxy servers that indicates a suspension of any rate limits that have been installed as a result of transmitting the messages to the proxy servers that indicate which source IP addresses of packets are not likely to be legitimately received at the proxy servers.

* * * * *